United States Patent
Zhang et al.

(10) Patent No.: US 12,013,749 B2
(45) Date of Patent: Jun. 18, 2024

(54) FAILED TEMPERATURE SENSOR DETECTION AND MITIGATION WITHIN DATA STORAGE DEVICES

(71) Applicant: Western Digital Technologies, Inc., San Jose, CA (US)

(72) Inventors: Hedan Zhang, Santa Clara, CA (US); Chaolun Zheng, Sunnyvale, CA (US); Ning Ye, San Jose, CA (US); Bret Dee Winkler, Mission Viejo, CA (US); Yanjun Xia, San Jose, CA (US); Wei Wu, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/853,510

(22) Filed: Jun. 29, 2022

(65) Prior Publication Data
US 2024/0004749 A1 Jan. 4, 2024

(51) Int. Cl.
*G06F 11/00* (2006.01)
*G06F 11/07* (2006.01)
*G06F 11/30* (2006.01)

(52) U.S. Cl.
CPC ........ *G06F 11/0793* (2013.01); *G06F 11/073* (2013.01); *G06F 11/076* (2013.01);
(Continued)

(58) Field of Classification Search
CPC ............. G06F 11/0703; G06F 11/0706; G06F 11/0727; G06F 11/073; G06F 11/0751;
(Continued)

(56) References Cited

U.S. PATENT DOCUMENTS 9,516,787 B2 * 12/2016 Iwama .................... G06F 1/206
2015/0043281 A1 2/2015 Hemink et al.
(Continued)

FOREIGN PATENT DOCUMENTS

EP 3697060 A1 8/2020

OTHER PUBLICATIONS

Y. Shi, T. K. S. Kumar and C. A. Knoblock, "Constraint-Based Learning for Sensor Failure Detection and Adaptation," 2018 IEEE 30th International Conference on Tools with Artificial Intelligence (ICTAI), Volos, Greece, 2018, pp. 328-335, doi: 10.1109/ICTAI.2018.00059. (Year: 2018).*

*Primary Examiner* — Joseph D Manoskey
(74) *Attorney, Agent, or Firm* — LOZA & LOZA, LLP; Gabriel Fitch

(57) ABSTRACT

Methods and apparatus for detecting a failed temperature sensor within a data storage device and for mitigating the loss of the sensor are provided. One such data storage device includes a non-volatile memory (NVM), a set of temperature sensors, and a processor coupled to the NVM and the temperature sensors. The processor is configured to detect failure of one of the temperature sensors and obtain temperature data from the other temperature sensors. The processor is further configured to estimate, based on the obtained temperature data, the temperature at the failed sensor, and then control at least one function of the data storage device based on the estimated temperature, such as controlling entry into a Read Only mode. In some examples, the processor estimates the temperature at the failed sensor or at various virtual sensor locations using pre-determined formulas having offsets and coefficients determined during an initial machine learning calibration procedure.

20 Claims, 13 Drawing Sheets

(52) U.S. Cl.
CPC ...... *G06F 11/3037* (2013.01); *G06F 11/3058* (2013.01); *G06F 2201/81* (2013.01)

(58) Field of Classification Search
CPC ............... G06F 11/0754; G06F 11/076; G06F 11/0793; G06F 11/3003; G06F 11/3037; G06F 11/3058; G06F 11/3093; G06F 11/3096; G06F 2201/81; G06F 2201/815
See application file for complete search history.

(56) References Cited

U.S. PATENT DOCUMENTS

| | | |
|---|---|---|
| 2018/0003572 A1* | 1/2018 | Garsd .................... G01K 13/00 |
| 2019/0108888 A1 | 4/2019 | Sarkar et al. |
| 2020/0033920 A1* | 1/2020 | Nielsen .............. G05D 23/1917 |
| 2021/0334253 A1 | 10/2021 | Darji et al. |
| 2022/0012147 A1* | 1/2022 | Ki ......................... G06F 11/203 |
| 2022/0076160 A1 | 3/2022 | Lloyd et al. |
| 2022/0334940 A1* | 10/2022 | Yang .................. G06F 11/3466 |

* cited by examiner

FAILED TEMPERATURE SENSOR DETECTION AND MITIGATION WITHIN DATA STORAGE DEVICES

FIELD

The subject matter described herein relates to data storage devices and controllers. More particularly, the subject matter relates, in some examples, to techniques for detecting a failed temperature sensor within a data storage device and mitigating the loss of the sensor.

INTRODUCTION

Data storage devices (DSDs), such as solid-state devices (SSDs), may generate a significant amount of heat during operation. In the case of SSDs, for example, a controller of an SSD may be instructed (e.g., by a host device) to execute a series of memory operations (e.g., read, write, etc.) with respect to one or more non-volatile memory devices (e.g., NAND Flash memory devices). Rapid execution of these memory operations to meet the performance demands of the host may cause excess heat to build up in the SSD. Such excess heat may raise the temperature of the SSD to a critical temperature (e.g., a temperature at which the SSD switches to a Read Only mode or shuts off entirely to prevent damage to the components of the SSD), thereby negatively impacting SSD performance with possible loss of user data.

Temperature sensors may be installed in SSDs to measure operating temperatures of particular components within the SSD (such as its control processor and its volatile and non-volatile memory components) or to measure the temperatures at particular locations within the SSD (such as the air inlet and outlet of the SSD). However, problems can arise if one or more of the temperature sensors fail. At least some aspects of the present disclosure are directed to detecting and mitigating such sensor failures.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data storage device (DSD) that includes a non-volatile memory (NVM), a plurality of temperature sensors, and a processor coupled to the NVM and the plurality of temperature sensors. The processor is configured to: detect a failure of one of the temperature sensors; obtain temperature data from the one or more of the other temperature sensors; estimate, based on the obtained temperature data, the temperature at the failed temperature sensor; and control at least one function of the data storage device based on the estimated temperature at the failed temperature sensor. In some aspects, the processor is further configured to: identify, based on the temperature sensor that failed, a formula for estimating the temperature at the failed temperature sensor from temperature data from one or more of the other temperature sensors, wherein parameters for the formulas are determined using machine learning during an initial calibration procedure.

Another aspect of the disclosure provides a method for use by a data storage device having an NVM and a plurality of temperature sensors. The method includes: detecting a failure of one of the temperature sensors; obtaining temperature data from the one or more of the other temperature sensors; estimating, based on the obtained temperature data, the temperature at the failed temperature sensor; and controlling at least one function of the data storage device based on the estimated temperature at the failed temperature sensor. In some aspects the method further includes: identifying, based on the temperature sensor that failed, a formula for estimating the temperature at the failed temperature sensor from temperature data from the one or more of the other temperature sensors.

Yet another aspect of the disclosure provides an apparatus for use with a data storage device having an NVM and a plurality of temperature sensors. The apparatus comprises: means for detecting a failure of one of the temperature sensors; means for obtaining temperature data from the one or more of the other temperature sensors; means for estimating, based on the obtained temperature data, the temperature at the failed temperature sensor; and means for controlling at least one function of the data storage device based on the estimated temperature at the failed temperature sensor. In some aspects, the apparatus further includes: means for identifying, based on the temperature sensor that failed, a formula for estimating the temperature at the failed temperature sensor from temperature data from one or more of the other temperature sensors.

DETAILED DESCRIPTION

Figure 1:
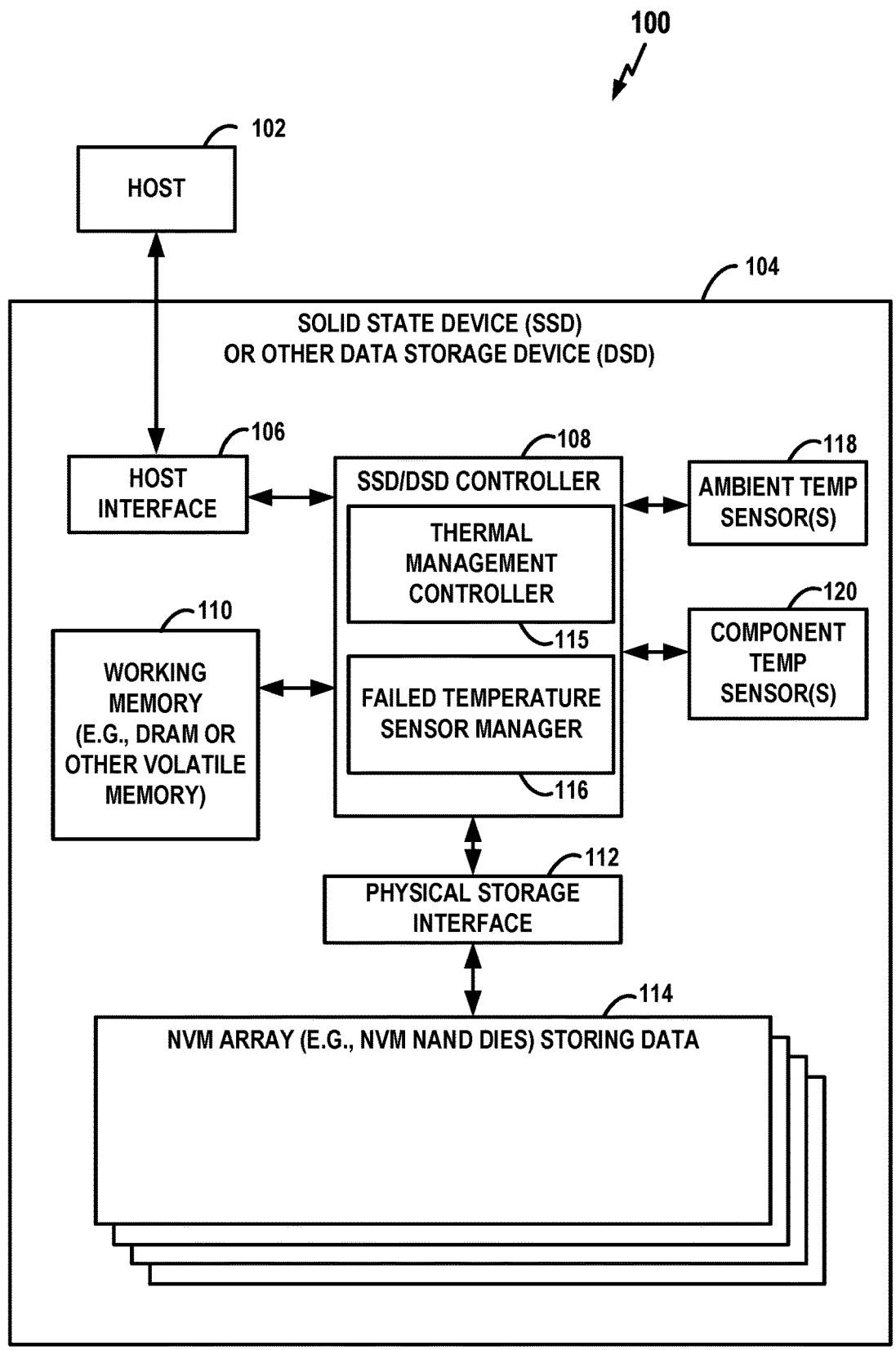
FIG. 1 is a schematic block diagram illustrating an exemplary data storage device (DSD) embodied as a solid-state device (SSD) including one or more temperature sensors and an SSD controller configured to control thermal management operations in accordance with some aspects of the disclosure, including managing SSD operations if one of the temperature sensors fails.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to data storage controllers of the DSDs. In the main examples described herein, data is stored within non-volatile memory (NVM) arrays. In other examples, data may be stored in hard disk drives (HDD) or tape drives. DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

For a particular SSD product form factor design and thermal environment, engineers should ensure that the temperatures of key components (e.g., NVM NAND dies, control processors, volatile memories, etc.), as well as enclosure touch temperatures, do not exceed allowable limits. In enterprise SSDs and other SSDs, multiple temperature sensors may be provided in the SSD. Some may be installed on a printed circuit board (PCB) of the SSD that holds the components and others may be provided on or within the components themselves (e.g., on or within an NVM NAND die). In some aspects, the actual temperature measurements from the sensors may be used to control the SSD by, for example, increasing fan speed to cool the device and then throttling SSD operations if temperatures still threaten to exceed their allowable limits. In other aspects, composite temperatures or virtual sensor temperatures may be generated from the actual temperature measurements, with the composite temperature or virtual sensor temperature then used to control the SSD. For example, a composite temperature may be obtained from a set of physical temperature sensors by (1) adjusting temperatures read from the physical sensors using unique offsets chosen based on the maximum physical temperature capability of the component being monitored, and then (2) selecting the largest value of all the adjusted temperatures. Virtual sensor temperatures may be determined, for example, by measuring temperatures using the set of physical temperature sensors, and then predicting or estimating the temperatures at other locations on or within the data storage device that do not have a sensor using the measured temperatures, such as the touch temperatures of the top and bottom enclosures. These may be referred to as virtual temperature sensor locations.

Whether actual temperature measurements are used to control the SSD or composite/virtual sensor temperatures are used, problems can arise if one or more of the physical sensors fail. In particular, should a physical temperature sensor fail it may be necessary to switch the SSD to a Read Only mode to ensure that the component temperatures do not exceed their thermal limits (potentially damaging the SSD and/or causing the loss of user data). However, switching to Read Only mode prevents the storage of data and, in some cases, can result in the loss of user data if the SSD continues to get hotter and exceeds the rated thermal specification, particularly if the SSD is the only non-volatile storage device of a system.

Aspects of the disclosure relate to improved techniques for thermal management of a data storage device, including failed temperature sensor detection and mitigation. One particular aspect involves a data storage device such as an SSD that includes an NVM and a set of temperature sensors. A processor of the device is configured to: detect a failure of one of the temperature sensors; obtain temperature data from the one or more of the other temperature sensors; estimate, based on the obtained temperature data, the temperature at the failed sensor; and control at least one function of the data storage device based on the estimated temperature at the failed sensor, such as controlling whether to switch the data storage device to Read Only mode.

In some aspects, a set of predetermined formulas are provided for use by the processor for estimating or predicting the temperature for the sensor that failed from the temperatures measured by one or more of the other sensors that are still functioning. In one particular example, the temperature of an NVM NAND die may be estimated from temperatures measured using sensors mounted to other components within the data storage device, such as a temperature sensor mounted near an application specific integrated circuit (ASIC) of the device (where the ASIC may be the control processor of the device) and a temperature sensor mounted near a clock generator of the device. As will be described below, in some aspects, machine learning may be employed during an initial calibration procedure to determine parameters for specifying the formulas, such as the coefficients and offsets of linear equations that may be used as the formulas. Machine learning may also be employed to determine the parameters for formulas for predicting or estimating virtual sensor temperatures for selected locations on or within the device that do not have their own physical temperature sensors. For example, if the data storage device does not have a temperature sensor mounted near its volatile memory, a formula may be used to estimate the temperature of the volatile memory from the temperatures measured at other locations. Thus, the formulas are not limited for use only in circumstances where a temperature sensor fails. In other aspects, rather than using formulas, the temperature of a failed sensor may be estimated using the temperature from the nearest functioning temperature sensor within the SSD.

In still other aspects, the temperature of a failed sensor may be estimated by averaging the temperatures from the other functioning temperature sensors within the SSD.

Several advantages are provided by these improved techniques for thermal management. For example, by providing formulas for accurately estimating the temperatures of failed sensors, the device need not to switch to Read Only mode when a sensor fails (unless the estimated temperatures for the failed sensor exceed predetermined safety limits). Hence, thermal protection mechanisms of the device are still valid and may be used despite the failed sensor, and so data may continue to be written to the device and the risk of data loss is mitigated. The estimated temperatures may be used also in the generation of composite temperatures for use with devices that exploit composite temperatures and for the estimation of virtual sensor temperatures. Moreover, the accurate estimation of temperatures for failed sensors enables the device to operate close to its thermal tolerances to provide the best possible performance even if a temperature sensor fails. In some aspects, by improving virtual sensor temperature estimations/predictions in different thermal environments and workloads, a thermal margin can be optimized to enable better thermal performance. Hence, customer operating fan speed can also be reduced or lowered. In the case of physical temperature sensor failure, using estimated temperatures and/or virtual sensor temperature predictions can keep thermal protection intact.

Exemplary Devices, Systems and Procedures

FIG. 1 is a schematic block diagram illustrating an exemplary DSD embodied as an SSD including one or more ambient temperature sensors, one or more component temperature sensors, and an SSD controller configured to control thermal management operations in accordance with some aspects of the disclosure, including managing operations if one of the temperature sensors fails. The system 100 includes a host 102 and the SSD 104 (or other DSD, but for simplicity referred to as an SSD below) coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples.

The SSD 104 includes a host interface 106, an SSD or DSD controller 108, a working memory 110 (such as dynamic RAM (DRAM) or other volatile memory), a physical storage (PS) interface 112 (e.g., flash interface module (FIM)), and an NVM array 114 having one or more dies storing data. The host interface 106 is coupled to the controller 108 and facilitates communication between the host 102 and the controller 108. The controller 108 is coupled to the working memory 110 as well as to the NVM array 114 via the PS interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies.

In some examples, the host 102 may be a laptop computer with an internal SSD and a user of the laptop may wish to playback video stored by the SSD. In another example, the host again may be a laptop computer, but the video is stored by a remote server.

Although, in the example illustrated in FIG. 1, SSD 104 includes a single channel between controller 108 and NVM array 114 via physical storage (PS) interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to working memory 110 for performing the various functions effected by the controller and to maintain and manage cached information stored in the working memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, ASIC, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The SSD controller 108 includes a thermal management controller 115, which can be configured to monitor actual measured component temperatures received from the component temperature sensors 120 and to control the SSD 104 based on the temperatures and/or send the temperature information to the host 102. For example, the thermal management controller 115 can be configured to detect component temperatures that are approaching their thermal limits and control the SSD 104 to, for example, throttle down operations to reduce the temperatures or take other mitigating actions. Additionally, the thermal management controller 115 can be configured to determine composite temperatures from one or more of the ambient temperature sensors 118 and the component temperature sensors 120, and throttle down operations in response to the composite temperatures approaching their thermal limits or take other mitigating actions. Composite temperatures, including procedures for computing composite temperatures, are described in detail in U.S. patent application Ser. No. 17/543,463, filed Dec. 6, 2021, entitled "MANAGEMENT OF COMPOSITE COLD TEMPERATURE FOR DATA STORAGE DEVICES", which is assigned to the assignee of the present application and fully incorporated by reference herein.

Still further, the thermal management controller 115 can be configured to estimate or predict virtual sensor temperatures from one or more of the ambient temperature sensors 118 and the component temperature sensors 120, where the virtual sensor temperatures represent the temperature at a location on or within the SSD 104 that lacks a physical temperature sensor. Operations may be throttled down in response to the temperatures approaching their thermal limits or other mitigating actions can be taken. If temperatures still threaten to exceed their thermal limits (by exceeding predetermined temperature thresholds that may vary for different components of the SSD), the thermal management controller 115 can control the SSD 104 to enter a Read Only mode to further reduce temperatures to prevent device damage (or shut down the SSD 104 completely). As explained above, switching to Read Only is preferably avoided since it can, in some cases, result in loss of user data, yet switching to Read Only is sometimes warranted to prevent device damage.

The SSD controller 108 also includes a failed temperature sensor manager 116, which can be configured to detect a failed temperature sensor and, in response, estimate (or predict) temperatures at the failed temperature sensor location. The estimated temperatures for the failed sensor may then be provided to the thermal management controller 115 for use in the place of actual temperature measurements from the sensor. For example, estimated failed sensor temperature values may be used to control the throttling of SSD operations if the temperatures approaching their thermal limits and/or may be used in the generation of composite temperatures or virtual sensor temperatures. Note that the estimated failed sensor temperature values may be regarded as a type of virtual sensor temperature but are used herein in estimating (or predicting) temperatures that would otherwise be measured by a physical temperature sensor rather than for estimating (or predicting) temperatures at locations where temperature sensors are not positioned.

In one aspect, the thermal management controller 115 and the failed temperature manager 116 are modules within the SSD controller 108 that are controlled by firmware. In one aspect, the thermal management controller 115 and the failed temperature manager 116 may be separate components from the SSD controller 108 and may be implemented using any combination of hardware, software, and firmware (e.g., like the implementation options described above for SSD controller 108) that can perform the operations as will be described in further detail below. In one example, the thermal management controller 115 and the failed temperature manager 116 are implemented using one or more firmware algorithms or other sets of instructions that can be performed on the SSD controller 108 to implement functions described below.

The working memory 110 may be any suitable memory, computing device, or system capable of storing data. For example, working memory 110 may be ordinary RAM, DRAM, double data rate (DDR) RAM, static RAM (SRAM), synchronous dynamic RAM (SDRAM), a flash storage, an erasable programmable Read Only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the PS interface 112 and stores the data. In some embodiments, working memory 110 may be replaced by a non-volatile memory such as MRAM, PCM, ReRAM, etc. to serve as a working memory for the overall device.

The NVM array 114 may be implemented using NAND flash memory. In one aspect, the NVM array 114 may be implemented using any combination of NAND flash, PCM arrays, MRAM arrays, and/or ReRAM. In one example, six NAND flash chips are provided. The PS interface 112 provides an interface to the NVM array 114. For example, in the case where the NVM array 114 is implemented using NAND flash memory, the PS interface 112 may be a flash interface module. In one aspect, the PS interface 112 may be implemented as a component of the SSD controller 108. In the example of FIG. 1, the controller 108 may include hardware, firmware, software, or any combinations thereof that provide the functionality for the failed temperature sensor manager 116.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 108 may be a controller in another type of device and still be configured to perform or control failed temperature sensor management, and perform some or all of the other functions described herein. Note also that, for generality, both ambient temperature sensors 118 and component temperature sensors 120 are shown. However, in some aspects, some of these sensors may be omitted. For example, in some embodiments, component temperature sensors 120 are provided but ambient temperature sensors 118 are omitted.

Temperature Estimation/Prediction in Response to a Failed Temperature Sensor

Figure 2:
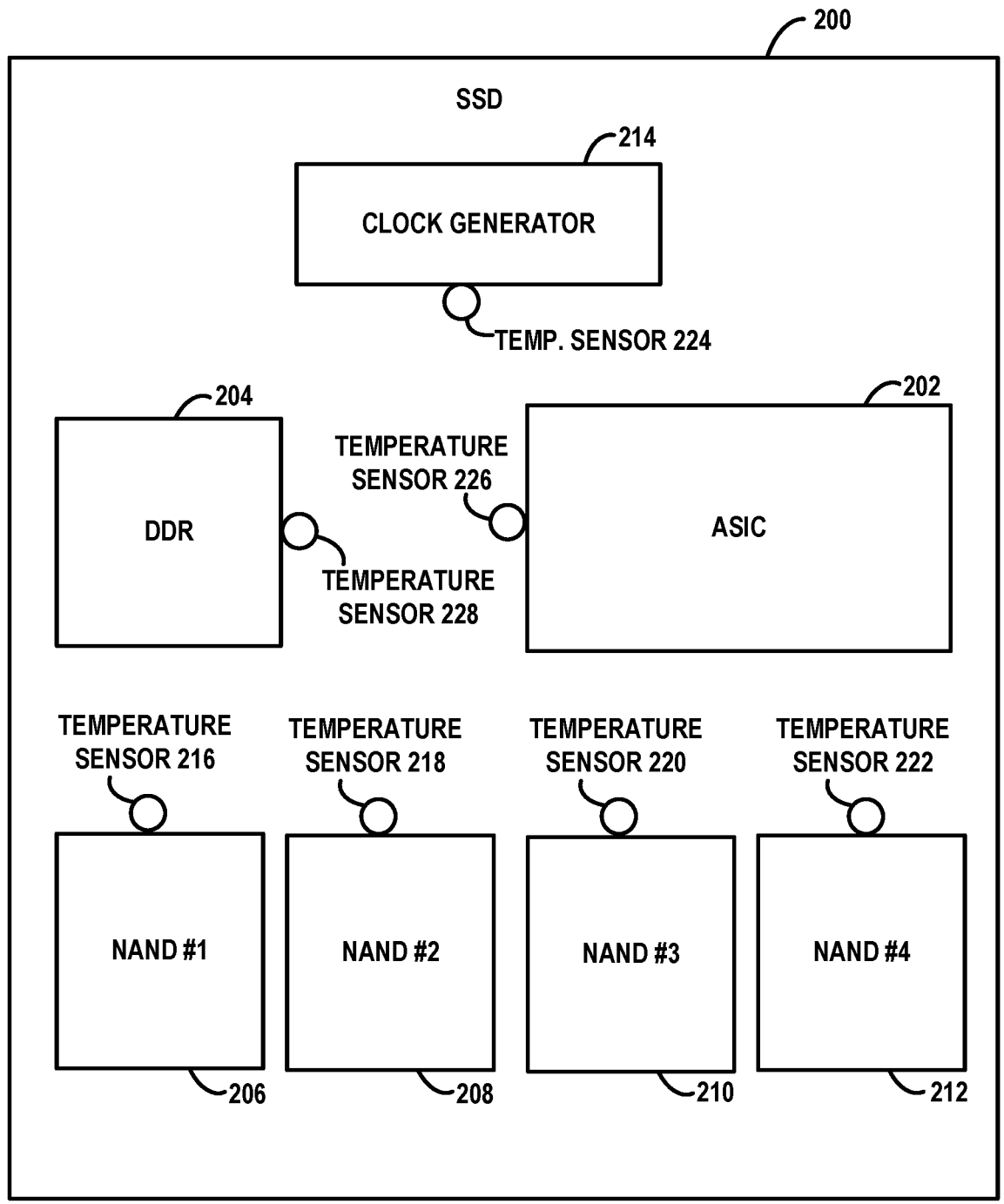
FIG. 2 illustrates selected components of an exemplary SSD, in accordance with some aspects of the disclosure.

FIG. 2 illustrates selected components of an exemplary SSD 200 having, in this particular example, an ASIC 202 (which may be a processor configured to control the SSD, such as controller 108 of FIG. 1), a DDR 204 (or other volatile memory device, such as the working memory 110 of FIG. 1), a first NAND 206, a second NAND 208, a third NAND 210, a fourth NAND 212 (which collectively may form an NVM array, such as NVM array 114 of FIG. 1), and a clock generator 214. The figure also illustrates a first temperature sensor 216 adjacent to the first NAND 206, a second temperature sensor 218 adjacent to the second NAND 208, a third temperature sensor 220 adjacent to the third NAND 210, and a fourth temperature sensor 222 adjacent to the fourth NAND 212, a fifth temperature sensor 224 adjacent to the clock generator 214, a sixth temperature sensor 226 adjacent to the ASIC 202, and a seventh temperature sensor 228 adjacent to the DDR 204. In other examples, more or fewer temperature sensors may be provided, including the aforementioned ambient temperature sensors. Not all components need to have a corresponding temperature sensor and, in examples described below, the DDR and at least one of the NANDs does not have a corresponding temperature sensor. Also, note that the diagram of FIG. 2 does not illustrate component interconnection lines and does not necessarily show the actual physical arrangement of components, which, in a practical system, may be arranged differently. Moreover, although the temperature sensors are shown as being laterally adjacent to selected components, in other examples a temperature sensor may be inside a component, such as inside a NAND, or may be mounted vertically above or below the component.

In the example of FIG. 2, the temperature or each component can ordinarily be determined by reading the latest temperature measurement from the corresponding temperature sensor. The ASIC 202 may include the thermal management controller 115 of FIG. 1 for processing the temperature measurements to initiate thermal protection mechanisms, if warranted due to any component temperatures nearing or exceeding their predetermined temperature limits. However, should one of the temperature sensors fail, the temperature of the corresponding component can be estimated (predicted) using temperature data from the other temperature sensors. For example, the ASIC 202 may additionally include the failed temperature sensor manager 116 of FIG. 1 for detecting the failed temperature sensor and, in response, estimating (predicting) temperatures at the failed temperature sensor based on the other measured temperatures.

Generally speaking, the temperature ($T_{FAILED}$) at a failed temperature sensor may be estimated using:

$$T_{FAILED} = \text{offset} + aT_1 + bT_2 + cT_3 + dT_4 + eT_5 + \ldots \quad \text{(EQ. 1)}$$

where $T_1$, $T_2$, $T_3$, etc. represent temperatures measured using (all or some) of the non-failed temperature sensors, and wherein the offset and the coefficients (a, b, c, etc.) are parameters that may be predetermined using linear regression based on a machine learning model (or other suitable procedures) during an initial machine learning calibration procedure. For example, a modified linear regression machine learning model with regularization (e.g., Lasso Regression and Rigid Regression) may be employed. That is, rather than using a simple linear regression model, additional regularization terms may be used to reduce overfitting and ensure an overall good accuracy across different situations and datasets. Preferably, the offsets and coefficients are determined so that each coefficient is −1<coefficient<1.

In some examples, and as will be explained in more detail below, the calibration procedure obtains measured test temperature data for a particular product design over a range of operating temperatures, a range of air flow speeds, and a range of data storage device workloads. (The measured test temperature data may be referred to as "historical temperature data" since the data will be used as a basis for determining formulas for estimating temperatures within an SSD at some future time while the SSD is operating.) Using a linear regression-based machine learning model, the calibration procedure determines the particular parameters for use in estimating the temperature for each component from the measured temperatures from each other component. Hence, a set of linear formulas may be predetermined where the set includes a different formula for each of the components for use if that particular component fails. The particular parameters (offset and coefficients) of each of the formulas generally differ from the particular parameters of the other formulas.

For the example of FIG. 2, the following general set of formulas may be used, where the calibration procedure determines the particular offset and coefficients for each equation using the linear regression-based machine learning model on measured test temperature data:

$$T_{CLOCK} = \text{offset}_1 + a_1 T_{DDR} + b_1 T_{ASIC} + c_1 T_{NAND\ \#1} + d_1 T_{NAND\ \#2} + e_1 T_{NAND\ \#3} + f_1 T_{NAND\ \#4} \quad \text{(EQ. 2)}$$

$$T_{DDR} = \text{offset}_2 + a_2 T_{CLOCK} + b_2 T_{ASIC} + c_2 T_{NAND\ \#1} + d_2 T_{NAND\ \#2} + e_2 T_{NAND\ \#3} + f_2 T_{NAND\ \#4} \quad \text{(EQ. 3)}$$

$$T_{ASIC} = \text{offset}_3 + a_3 T_{CLOCK} + b_3 T_{DDR} + c_3 T_{NAND\ \#1} + d_3 T_{NAND\ \#2} + e_3 T_{NAND\ \#3} + f_3 T_{NAND\ \#4} \quad \text{(EQ. 4)}$$

$$T_{NAND\ \#1} = \text{offset}_4 + a_4 T_{CLOCK} + b_4 T_{DDR} + c_4 T_{ASIC} + d_4 T_{NAND\ \#2} + e_4 T_{NAND\ \#3} + f_4 T_{NAND\ \#4} \quad \text{(EQ. 5)}$$

$$T_{NAND\ \#2} = \text{offset}_5 + a_5 T_{CLOCK} + b_5 T_{DDR} + c_5 T_{ASIC} + d_5 T_{NAND\ \#1} + e_5 T_{NAND\ \#3} + f_5 T_{NAND\ \#4} \quad \text{(EQ. 6)}$$

$$T_{NAND\ \#3} = \text{offset}_6 + a_6 T_{CLOCK} + b_6 T_{DDR} + c_6 T_{ASIC} + d_6 T_{NAND\ \#1} + e_6 T_{NAND\ \#2} + f_6 T_{NAND\ \#4} \quad \text{(EQ. 7)}$$

$$T_{NAND\ \#4} = \text{offset}_7 + a_7 T_{CLOCK} + b_7 T_{DDR} + c_7 T_{ASIC} + d_7 T_{NAND\ \#1} + e_7 T_{NAND\ \#2} + f_7 T_{NAND\ \#3} \quad \text{(EQ. 8)}$$

As a practical matter, only those temperature sensors in relatively close proximity to the failed temperature sensor often contribute significantly to the temperature estimate. Hence, in some examples, the machine learning calibration procedure may be configured to automatically eliminate factors in the formulas that do not contribute significantly to the estimate (by, for example, zeroing out any coefficient that is below some threshold, such as 0.1) to thereby simplify the formulas. Moreover, for a particular SSD form factor design, engineers will often know in advance what temperature sensors are expected to be useful in estimating the temperatures for other failed sensors. Hence, the calibration procedure may be pre-configured to determine only the parameters that relate certain temperature sensor values to a given failed sensor. For example, in the case of FIG. 2, the calibration system may be configured for use in determining $T_{CLOCK}$ from just the DDR and ASIC measured temperatures (i.e., $T_{CLOCK} = \text{offset}_1 + a_1 T_{DDR} + b_1 T_{ASIC}$) with the smaller contributions from the more distant NAND sensors ignored. Note also that in SSDs that include ambient temperature sensors (e.g., inlet and outlet temperature sensors), additional formulas may be provided for estimating temperatures at those locations should one of those sensors fail.

Figure 3:
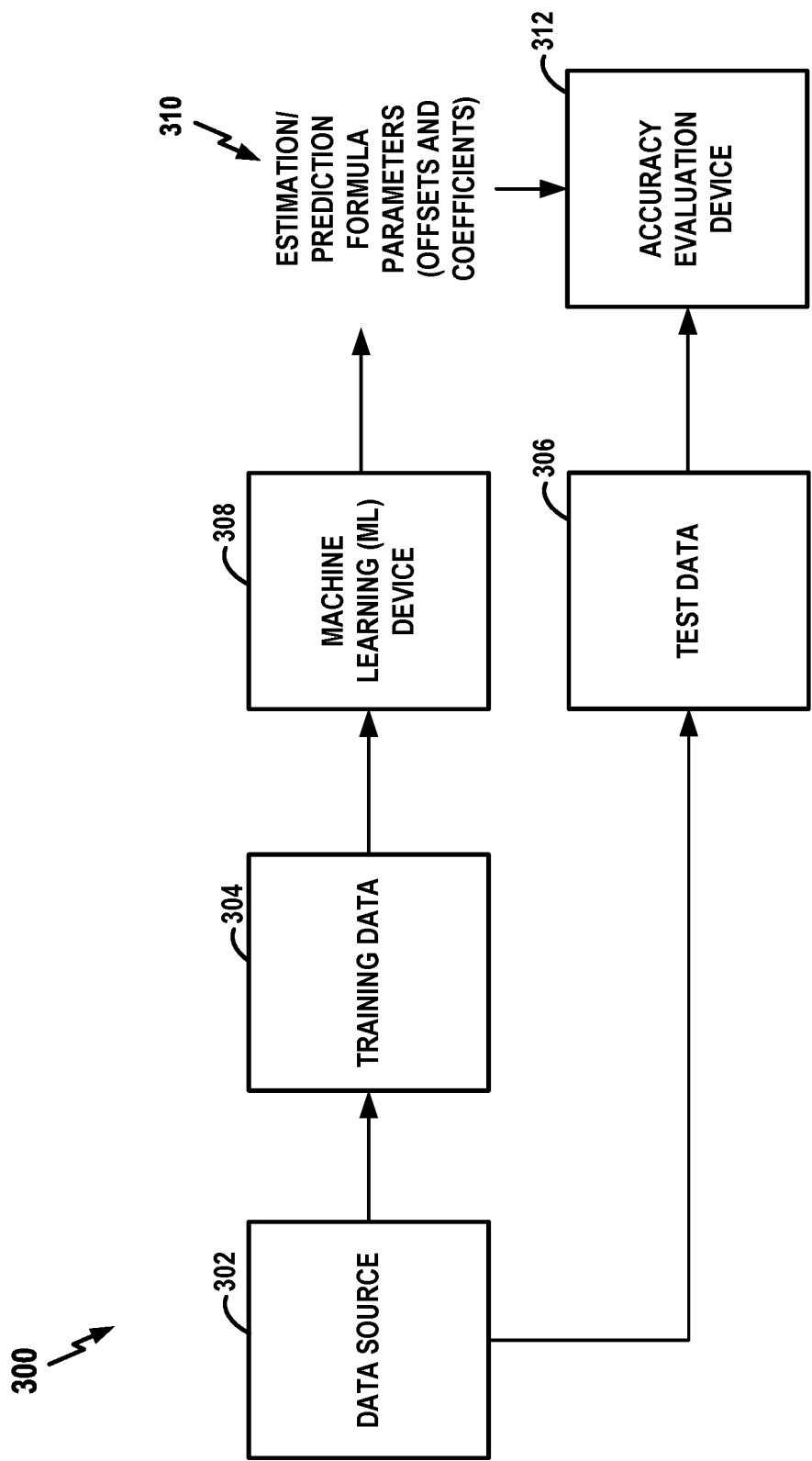
FIG. 3 illustrates an exemplary machine learning calibration system, in accordance with some aspects of the disclosure.

FIG. 3 illustrates an exemplary machine learning calibration system 300 at a high level, which may be used, for example, during device characterization. A data source 302 provides training data 304 and testing data 306. The training data may be initially obtained by running a test SSD (having a particular form factor design) under various operating conditions, including various ambient temperatures, various air flow speeds (e.g., various fan speeds), and with various SSD workloads (e.g., during sequential reads, sequential writes, random reads, random writes, idle mode, etc.). As the SSD is tested, temperatures are read out from each physical temperature sensor to create a large and robust training data set. A machine learning device 308 then performs or applies a linear regression-based machine learning model to the data to determine the parameters 310 (offsets and coefficients) for each of the different estimation (prediction) formulas or equations. For example, the system determines the parameters for use with Equations 2-8, shown above. Note that the use of linear regression-based machine learning models and procedures are well-known (such as the aforementioned linear regression model with regularization, e.g., Lasso Regression and Rigid Regression, and will not be described in detail herein. Note also that the techniques described herein are not limited to the particular, exemplary procedures that have been described. Those particular techniques are just illustrative examples.

Additionally, as shown in FIG. 3, the data source 302 provides the test data 306 to an accuracy evaluation (validation) device 312 to determine whether the parameters 310 are sufficiently accurate to estimate temperatures of a failed sensor. For example, the test data 306 may consist of newly measured temperatures, which are compared to estimated temperatures generated using the current set of parameters 310 to determine error values for each of the equations. If the estimated temperatures are found to adequately match the actual temperatures over a range of expected operating conditions (e.g., any errors are at or below predetermined thresholds), the parameters 310 are validated and may be programmed into the SSD for use in estimating temperatures in the SSD if one of the temperature sensors fail. If the errors are found to be too large (e.g., above the thresholds), the machine learning procedure may be repeated and/or adjusted to improve its accuracy. Thus, although not specifically shown in FIG. 3, feedback may be provided from the accuracy evaluation device 312 to the machine learning device 308, which the machine learning device 308 uses to adjust the parameters 310 to improve the accuracy of the estimations (predictions). In some examples, a suitable error threshold is 2° C. In other examples, the threshold is 1.5° C.

Figure 4:
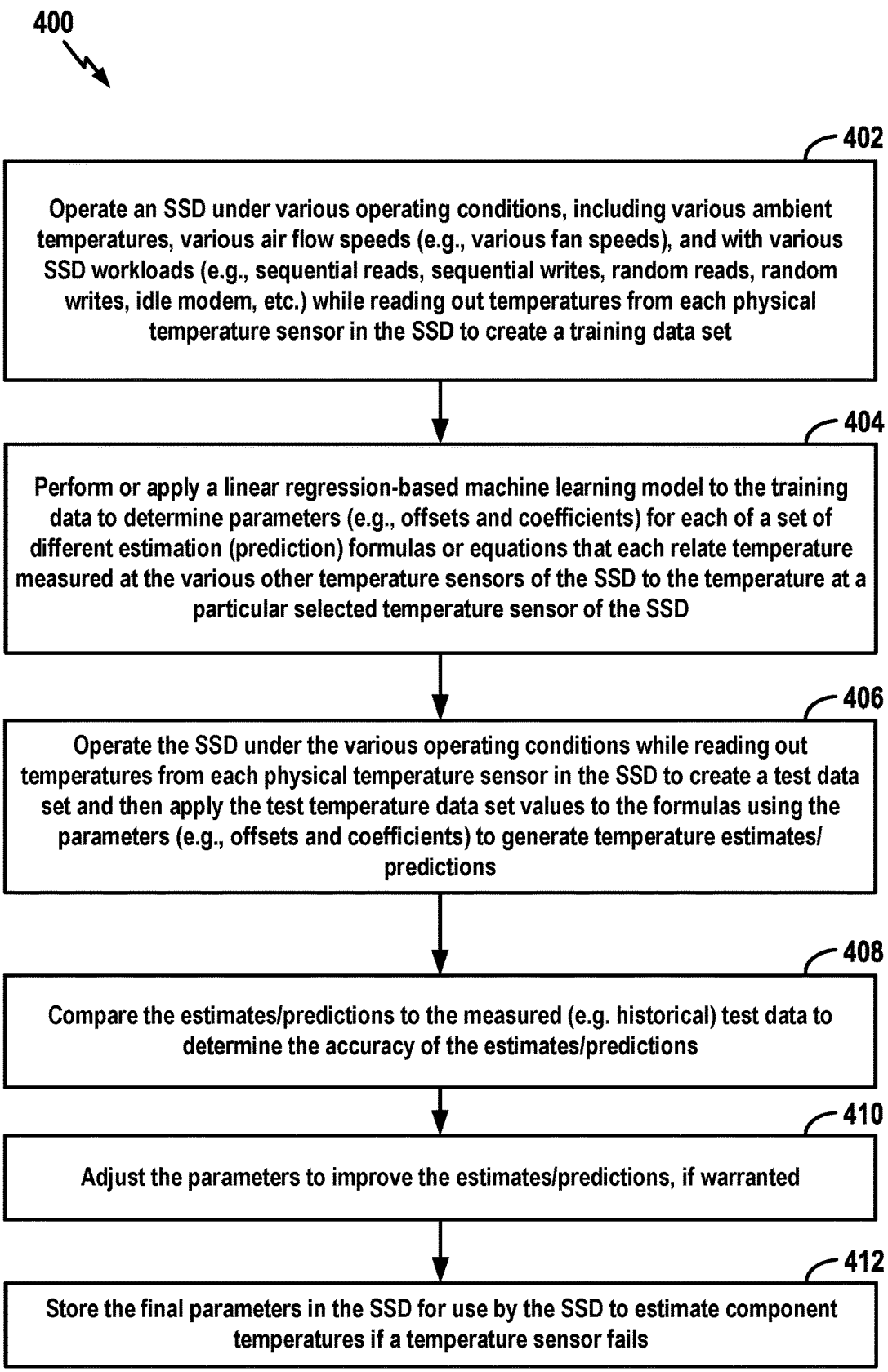
FIG. 4 illustrates an exemplary machine learning calibration procedure, in accordance with some aspects of the disclosure.

FIG. 4 summarizes an exemplary machine learning calibration procedure 400 that may be performed by the calibration system 300 of FIG. 3 (or other suitable system) to generate the parameters for use in estimating temperatures at failed sensors. At block 402, the calibration system operates an SSD under various operating conditions, including various ambient temperatures, various air flow speeds (e.g., various fan speeds), and with various SSD workloads (e.g., sequential reads, sequential writes, random reads, random writes, idle mode, etc.) while reading temperatures from each physical temperature sensor in the SSD to create a training data set. At block 404, the calibration system performs or applies a linear regression-based ML model to the training data to determine parameters (e.g., offsets and coefficients) for each of a set of different estimation (prediction) formulas or equations that each relate the temperatures measured at the various other temperature sensors of the SSD to the temperature at a particular selected temperature sensor of the SSD. For example, the calibration system determines the parameters for use with Equations 2-8, shown above. (As will be explained further below, formulas may also be generated that relate temperatures measured at the physical temperature sensor locations to locations or components within the SSD that do not have sensors, such as the top or bottom enclosures of the SSD. That is, formulas may also be generated for providing virtual sensor temperature estimates.)

At block 406, the calibration system again operates the SSD under the various operating conditions while reading out temperatures from each physical temperature sensor in the SSD to create a test data set and apply the test temperature data set values to the formulas using the parameters (e.g., offsets and coefficients) determined in block 404 to generate temperature estimates/predictions. At block 408, the calibration system compares the estimates/predictions to the measured test data (e.g., the historical temperature data) to determine the accuracy of the estimates/predictions. At block 410, the calibration system adjusts the parameters to improve the estimates/predictions, if warranted. At block 412, the calibration system stores the final parameters in the SSD for use by the SSD to estimate component temperatures if a temperature sensor fails.

Note that the equations listed above and the procedures that have been described provide a generalized procedure for determining the parameters for the equations. In many practical implementations engineers will know what temperatures sensors are expected to be useful in estimating (predicting) the temperatures at certain components. Hence, the ML procedure may be configured to determine only the parameters that relate particular temperature sensor values to a given failed sensor. Note also that, although primarily described with reference to examples wherein the calibration system is separate from the SSD and is used during device characterization, at least some of the machine learning features described herein (such as those described in connection with Equations 2-8) may be implemented within a suitably-equipped SSD to, for example, update, adjust, or adapt an initial set of offsets and coefficients stored within the SSD to compensate for changes in the device or to fine-tune the offsets and coefficients during SSD usage.

Figure 5:
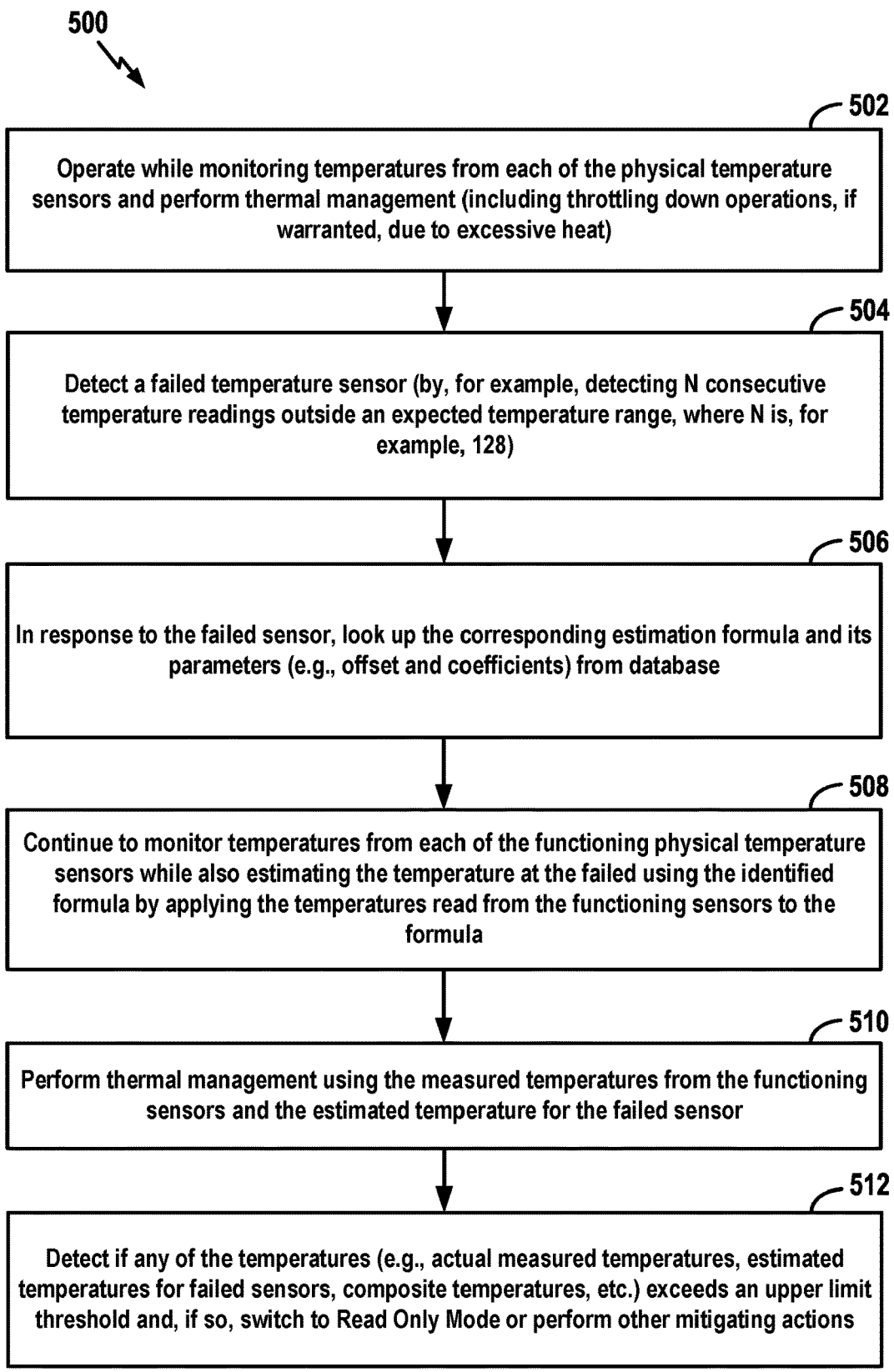
FIG. 5 illustrates exemplary procedure that may be performed by an SSD for detecting and responding to a failed temperature sensor, in accordance with some aspects of the disclosure.

FIG. 5 summarizes an exemplary procedure 500 that may be performed by the SSD 104 of FIG. 1 (or other suitable device) for detecting and responding to a failed temperature sensor. The procedure may be performed, for example, by an SSD that has been programmed with the above-described estimation (prediction) formulas for estimating temperatures at failed sensors. That is, the SSD may be programmed or loaded with a datastore (e.g., database or data structure) that includes the coefficients and offsets for the formulas as determined by the machine learning calibration procedures of FIGS. 3-4.

At block 502, the SSD 104 operates while its thermal management controller 115 monitors temperatures from each of the physical temperature sensors and performs thermal management (including throttling down operations, if warranted, due to excessive heat). Thermal management may involve composite temperatures that are derived from the actual temperatures. At block 504, the failed temperature sensor manager 116 detects a failed temperature sensor (by, for example, detecting N consecutive temperature readings outside an expected temperature range, where N is, for example, 128). The expected temperature range may be a pre-programmed range of values that, in some examples, may differ for each sensor. At block 506, in response to the failed sensor, the failed temperature sensor manager 116 looks up the corresponding estimation formula and its parameters (e.g., its offset and coefficients) from the datastore which may be, for example, stored in NVM array 114.

At block 508, the failed temperature sensor manager 116 continues to monitor temperatures from each of the functioning physical temperature sensors while also estimating the temperature at the failed using the identified formula by applying the temperatures read from the functioning sensors to the formula. Hence, for example, if the ASIC temperature sensor has failed, the formula of Equation 4 (above) is identified as the correct formula to use, its offset and coefficients are read out from the datastore, and the formula is applied using temperatures measured at the other functioning temperature sensors to estimate the ASIC temperature ($T_{ASIC}$). At block 510, the thermal management controller 115 performs thermal management using the measured temperatures from the functioning sensors and the estimated temperature for the failed sensor (e.g., $T_{ASIC}$). Again, this may involve generating composite temperatures. At block 512, the thermal management controller detects if any of the temperatures (e.g., actual measured temperatures, estimated temperatures for failed sensors, composite temperatures, etc.) exceeds an upper limit threshold (which may differ for each component) and, if so, switches the SSD to Read Only mode or performs other mitigating actions. In some examples, a predetermined number of temperature estimates/readings must exceed the upper limit before the SSD is switched to Read Only Mode (to prevent one or two high readings from triggering a premature switch to Read Only). Note also that, in actual SSDs, the NANDs are often the most at risk of overheating and so NAND temperatures are often the limiting factor in thermal management.

Virtual Sensor Temperature Estimation/Prediction and Mitigating Actions

Figure 6:
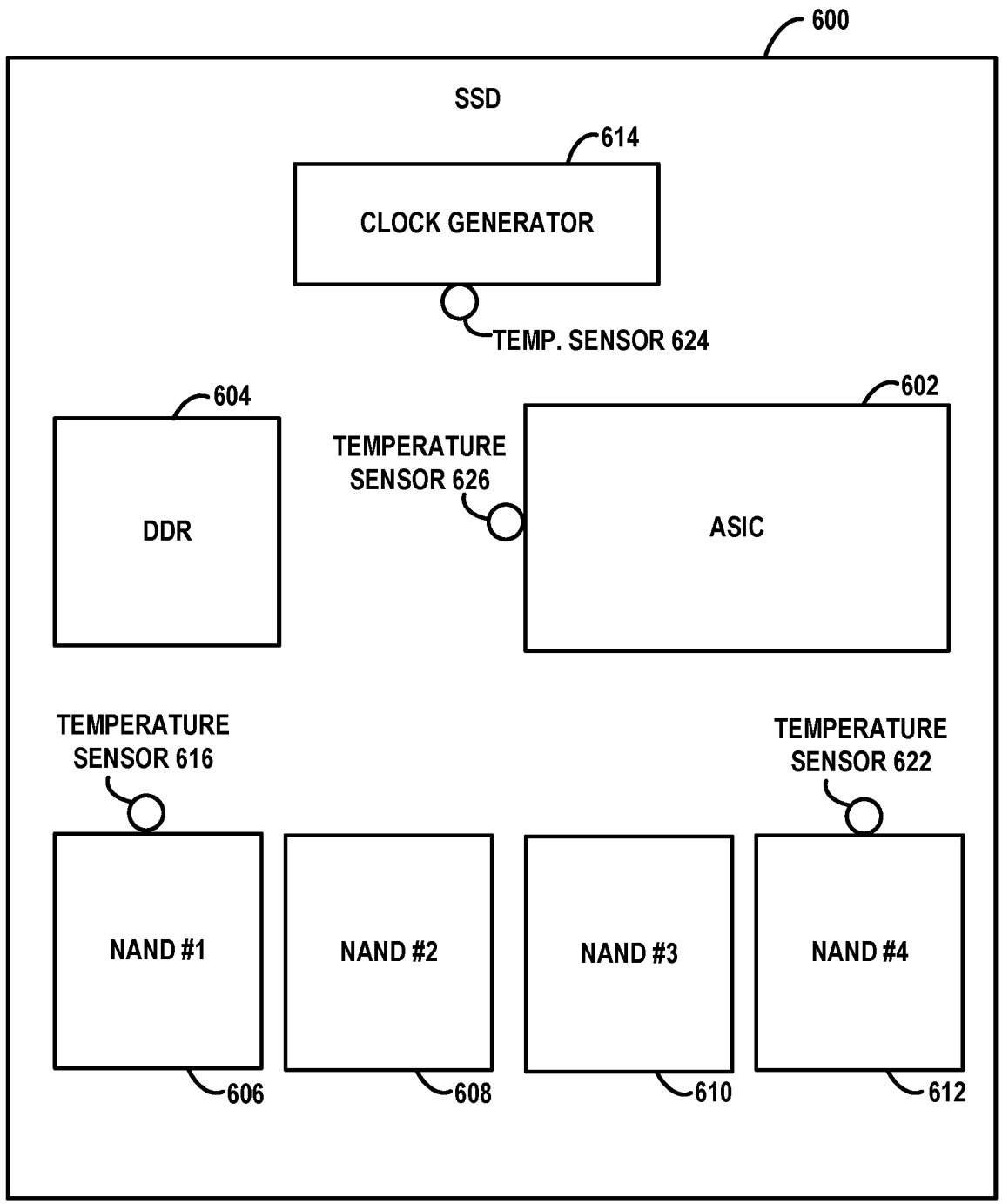
FIG. 6 illustrates selected components of another exemplary SSD, in accordance with some aspects of the disclosure.

FIG. 6 illustrates selected components of an exemplary SSD 600 that is similar to the SSD 200 of FIG. 2 but lacks temperature sensors at its DDR and two of its NANDs. Since these components do not have their own temperature sensors, virtual sensor temperatures are instead estimated (predicted) for those components and thermal management is performed, in part, using the virtual sensor temperatures. SSD 600 has an ASIC 602 (which may be a processor configured to control the SSD, such as controller 108 of FIG. 1), a DDR 604 (or other volatile memory device, such as the working memory 110 of FIG. 1), a first NAND 606, a second NAND 608, a third NAND 610, a fourth NAND 612 (which collectively may form an NVM array, such as NVM array 114 of FIG. 1), and a clock generator 614. The figure illustrates a temperature sensor 616 adjacent to the first NAND 606 and a temperature sensor 622 adjacent to the fourth NAND 612 (but no temperature sensors adjacent to NAND 608 or NAND 610). A temperature sensor 624 is adjacent to the clock generator 614 and a temperature sensor 626 is adjacent to the ASIC 602 (but there is no temperature sensor adjacent to the DDR 604). In other examples, more or fewer temperature sensors may be provided, including the aforementioned ambient temperature sensors. The diagram of FIG. 6 does not illustrate component interconnection lines and does not necessarily show the actual physical arrangement of components, which, in a practical system, may be arranged differently. Moreover, although the temperature sensors are shown as being laterally adjacent to selected components, in other examples a temperature sensor may be inside a component, such as inside a NAND, or may be mounted vertically above or below the component.

In the example of FIG. 6, the temperature for the DDR 604 and for NANDs 608 and 610 are estimated (predicted) as virtual sensor temperatures. Virtual sensor temperatures for other locations on or in the SSD, such as the top and bottom of the SSD enclosure, may also be determined. The ASIC 602 may include the thermal management controller 115 of FIG. 1 for estimating (predicting) the virtual sensor temperatures and for processing temperature measurements and the virtual sensor temperatures to initiate thermal protection mechanisms, if warranted due to any component temperatures nearing or exceeding their predetermined temperature limits.

Generally speaking, a virtual sensor temperature ($T_{VIRTUAL\ SENSOR}$) may be estimated using:

$$T_{VIRTUAL\ SENSOR} = \text{offset} + aT_1 + bT_2 + cT_3 + dT_4 + eT_5 + \ldots \quad \text{(EQ. 9)}$$

where $T_1$, $T_2$, $T_3$, etc. represent the temperatures measured using (all or some) of the actual temperature sensors, and wherein the offset and the coefficients (a, b, c, etc.) are parameters that may be predetermined using the linear regression-based ML model (or other suitable procedures) during an initial machine learning calibration procedure.

In some examples, the calibration procedure obtains measured test temperature data from the actual sensors and also obtains temperature readings using a thermocouple (or the like) for the components that do not have temperatures sensors and for other locations (e.g., the top and bottom of the enclosure) that do not have temperature sensors. This is done for a particular product design over a range of operating temperatures, a range of air flow speeds, and a range of data storage device workloads. Using the linear regression-based ML model, the calibration procedure determines the particular parameters for use in estimating virtual sensor temperatures for the components or locations that lack temperature sensors. Hence, a set of linear formulas may be predetermined where the set includes a different formula for various components or locations that do not have their own sensors.

For the example of FIG. 6, the following general set of formulas may be used, where the calibration procedure determines the particular offset and coefficients for each equation using the linear regression-based ML model on measured test temperature data:

$$T_{DDR} = \text{offset}_8 + a_8 T_{CLOCK} + b_8 T_{ASIC} + c_8 T_{NAND\ \#1} + f_8 T_{NAND\ \#4} \quad \text{(EQ. 10)}$$

$$T_{NAND\ \#2} = \text{offset}_9 + a_9 T_{CLOCK} + c_9 T_{ASIC} + d_9 T_{NAND\ \#1} + f_9 T_{NAND\ \#4} \quad \text{(EQ. 11)}$$

$$T_{NAND\ \#3} = \text{offset}_{10} + a_{10} T_{CLOCK} + c_{10} T_{ASIC} + d_{10} T_{NAND\ \#1} + f_{10} T_{NAND\ \#4} \quad \text{(EQ. 12)}$$

$$T_{TOP} = \text{offset}_{11} + a_{11} T_{CLOCK} + c_{11} T_{ASIC} + d_{11} T_{NAND\ \#1} + f_{11} T_{NAND\ \#4} \quad \text{(EQ. 13)}$$

$$T_{BOTTOM} = \text{offset}_{12} + a_{12} T_{CLOCK} + c_{12} T_{ASIC} + d_{12} T_{NAND\ \#1} + f_{12} T_{NAND\ \#4} \quad \text{(EQ. 14)}$$

As a practical matter, only those temperature sensors in relatively close proximity to component or location lacking a sensor will likely contribute significantly to the virtual sensor temperature estimate. Hence, in some examples, the machine learning calibration procedure may be configured to automatically eliminate factors in the formulas that do not contribute significantly to the estimate to thereby simplify the formulas. Moreover, for a particular SSD form factor design, engineers will often know in advance what temperature sensors are expected to be useful in estimating (predicting) virtual sensor temperatures. Hence, the calibration procedure may be pre-configured to determine only the parameters that relate certain temperature sensor values to a given virtual sensor temperature.

Referring again to FIG. 3, the machine learning calibration system 300 shown therein may also be used to calibrate the estimation (prediction) of virtual sensor temperatures. The data source 302 again provides training data 304 and testing data 306. The training data may be initially obtained by running a test SSD (having a particular form factor design) under various operating conditions, including various ambient temperatures, various air flow speeds (e.g., various fan speeds), and with various SSD workloads (e.g., during sequential reads, sequential writes, random reads, random writes, idle mode, etc.). As the SSD is tested, temperatures are read out from each physical temperature sensor and are also obtained from thermocouples attached to the components and/or locations for which virtual sensor temperatures are to be estimated. The machine learning device 308 performs or applies the linear regression-based ML model to the data to determine the parameters 310 (offsets and coefficients) for each of the different virtual sensor temperature estimation (prediction) formulas or equations. For example, the system determines the parameters for use with Equations 10-14.

Additionally, as shown in FIG. 3, the data source 302 provides the test data 306 to an accuracy evaluation device 312 to determine whether the parameters 310 are sufficiently accurate to estimate the virtual sensor temperatures. For example, the test data 306 may consist of newly measured temperatures obtained using the thermocouples, which are compared to the virtual sensor temperatures generated using the current set of parameters 310 to determine error values or differentials for each of the equations. If the virtual sensor temperatures are found to adequately match the actual temperatures measured using the thermocouples (over a range of expected operating conditions), the parameters 310 are thereby validated and may be programmed into the SSD for use in estimating virtual sensor temperatures in the SSD. If the errors are too large (e.g., above the thresholds), the machine learning procedure may be repeated and/or adjusted.

Figure 7:
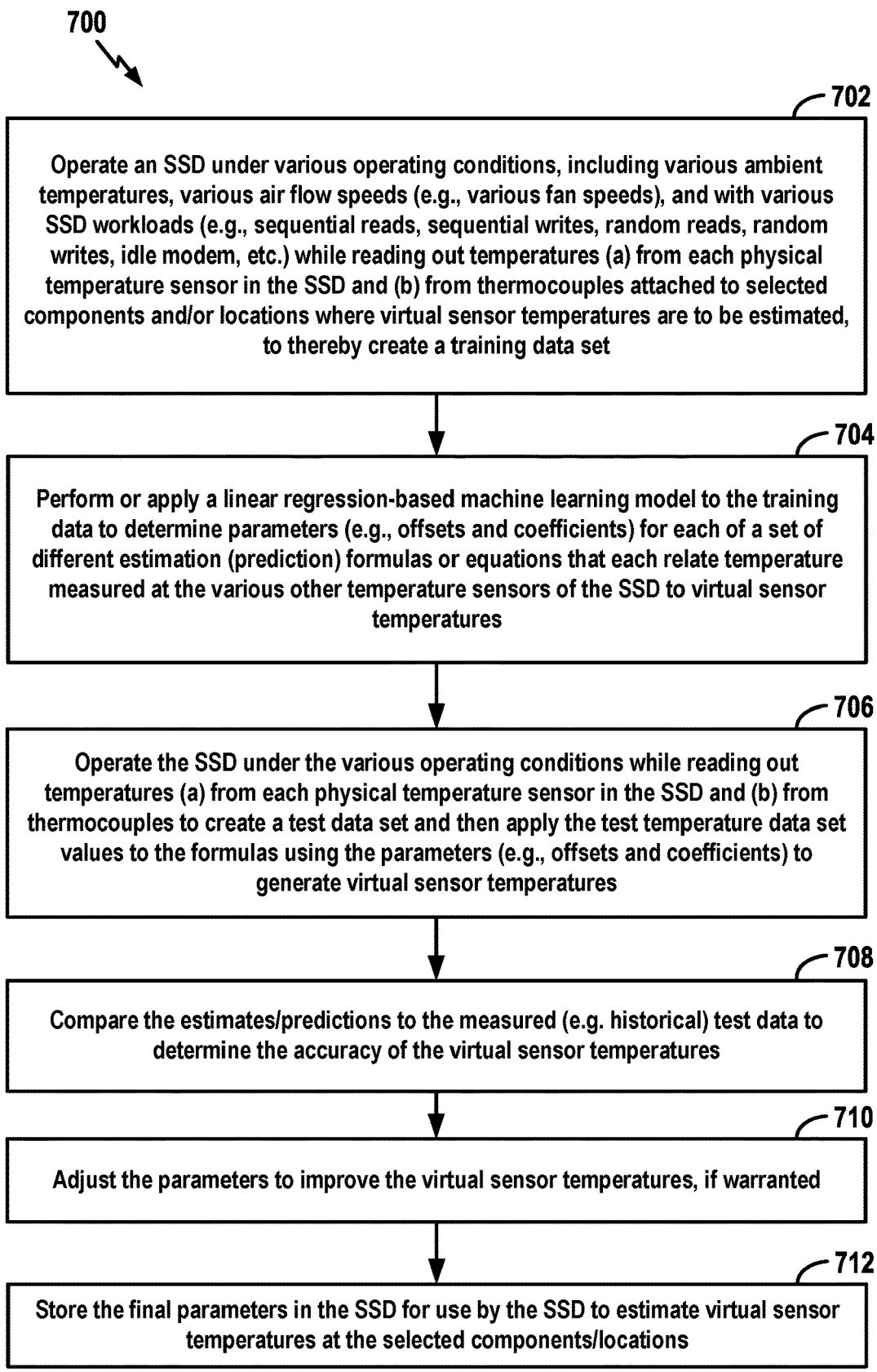
FIG. 7 illustrates an exemplary machine learning calibration procedure, in accordance with some aspects of the disclosure.

FIG. 7 summarizes an exemplary machine learning calibration procedure 700 that may be performed by the calibration system 300 of FIG. 3 (or other suitable system) for use in generating the parameters for estimating virtual sensor temperatures (e.g., to generate the parameters for use in estimating temperatures at locations that do not have temperature sensors, such as the top and bottom enclosures of the device). At block 702, the calibration system operates an SSD (e.g., performs various access commands such as reads, writes, and the like) under various operating conditions, including various ambient temperatures, various air flow speeds (e.g., various fan speeds), and with various SSD workloads (e.g., sequential reads, sequential writes, random reads, random writes, idle mode, etc.) while reading out temperatures (a) from each physical temperature sensor in the SSD and (b) from thermocouples attached to selected components and/or locations where virtual sensor temperatures are to be estimated, to thereby create a training data set. At block 704, the calibration system performs or applies the linear regression-based ML model to the training data to determine parameters (e.g., offsets and coefficients) for each of a set of different estimation (prediction) formulas or equations that each relate the temperatures measured at the various temperature sensors of the SSD to the virtual sensor temperatures. For example, the calibration system determines the parameters for use with Equations 10-14, shown above.

At block 706, the calibration system again operates the SSD under the various operating conditions while reading out temperatures (a) from each physical temperature sensor in the SSD and (b) from the thermocouples to create a test data set and apply the test temperature data set values to the formulas using the parameters (e.g., offsets and coefficients) determined in block 704 to generate virtual sensor temperatures. At block 708, the calibration system compares the virtual sensor temperatures to the measured test data (e.g., the historical temperature data) to determine the accuracy of the estimates/predictions. At block 710, the calibration system adjusts the parameters to improve the virtual sensor temperature estimates/predictions, if warranted. At block 712, the calibration system stores the final parameters in the SSD for use by the SSD to estimate virtual sensor temperatures at the selected locations/components.

Note that virtual sensor equations listed above and the procedures that have been described provide a generalized procedure for determining the parameters for the virtual sensor equations. In many practical implementations engineers will know what temperatures sensors are expected to be useful in generating virtual sensor temperatures at certain components and/or locations. Hence, the machine learning procedure may be configured to determine only the parameters that relate particular temperature sensor values to particular virtual sensor locations.

Note also that, should one of the temperature sensors that is used to generate a particular virtual sensor temperature fail, alternative virtual sensor temperature formulas may be used that generate the virtual sensor temperature from the remaining (functioning) temperature sensors. In one example, the device may first estimate the temperature at the failed temperature sensor using the applicable failed sensor formula and then insert that estimate into the virtual sensor temperature formula to generate the virtual sensor temperature for another component or location. For example, in an SSD that lacks a DDR temperature sensor, if the ASIC temperature sensor fails, a first formula may be used to estimate the ASIC temperature from the other functioning sensors (e.g., the clock generator and the NAND sensors). The resulting ASIC temperature estimate is then inserted into Equation 10 to estimate the virtual sensor temperature at the DDR. Alternatively, the calibration system may be configured to generate a set of alternative virtual sensor temperature formulas for use in generating virtual sensor temperatures in case particular physical sensors fail. For example, in an SSD that lacks a DDR temperature sensor, Equation 10 may be used to estimate $T_{DDR}$ if all physical sensors are functioning, but the following different formula may be calibrated to estimate $T_{DDR}$ if the ASIC temperature sensor fails:

$$T_{DDR} = \text{offset}_{13} + a_{13} T_{CLOCK} + c_{13} T_{NAND\ \#1} + f_8 T_{NAND\ \#4} \quad \text{(EQ. 15)}$$

In this particular example, the calibration system determines the offset and coefficient values for Equation 15 using the linear regression-based ML model by measuring $T_{DDR}$ using a thermocouple attached to the DDR while reading out measurements from the clock generator temperature sensors and the two NAND temperature sensors. A corresponding formula may be calibrated for estimating $T_{DDR}$ from the ASIC temperature sensor and the NAND sensors if the clock generator sensor fails, and so on. Similar formulas may be calibrated for estimating the other virtual sensor temperatures ($T_{NAND\ \#2}$, $T_{NAND\ \#3}$, $T_{TOP}$ and $T_{BOTTOM}$) from various combinations of physical sensors to account for failed sensors.

In an illustrative example, the following offsets and coefficients are used in formulas for generating virtual sensor temperatures for selected components that lack a temperature sensor (where U203, U200, and U102 refer to different exemplary NANDs):

$$T_{DDR} = -2.021 + 0.602 * T_{ASIC} + 0.341 * T_{CLOCK} \quad \text{(EQ. 16)}$$

$$T_{NAND(U200)} = -0.753 + 0.068 * T_{ASIC} + 0.355 * T_{CLOCK} + 0.056 * T_{NAND(U203)} \quad \text{(EQ. 17)}$$

$$T_{TOP} = 0.684 + 0.802 * T_{NAND(U102)} + 0.140 * T_{NAND(U203)} \quad \text{(EQ. 18)}$$

$$T_{BOTTOM} = -1.715 + 0.791 * T_{ASIC} + 0.115 * T_{CLOCK} \quad \text{(EQ. 19)}$$

In the illustrative example, if the ASIC temperature sensor fails, $T_{ASIC}$ may be estimated using the following formula:

$$T_{ASIC} = -3.492 + 0.660 * T_{CLOCK} + 0.258 * T_{NAND(U203)} \quad \text{(EQ. 20)}$$

In the illustrative example, since the ASIC temperature has failed, alternative formulas are used to estimate the virtual sensor temperatures (without needing to use $T_{ASIC}$). Although alternative formulas can be obtained by simple substitution (by, for example, computing a new formula for estimating $T_{DDR}$ by plugging Eq. 20 into Eq. 16), accuracy can be improved by instead performing separate ML training using a data set that does not include data from the ASIC temperature sensor. This can help avoid introducing biases that might otherwise arise when using simple substitution. The following exemplary formulas (Eq. 21, 22, and 23) were obtained using separate ML training, and so the specific offset and calibration values differ from what would be obtained via simple substitution.

$$T_{DDR} = -0.0231 + 0.97 * T_{CLOCK} \quad \text{(EQ. 21)}$$

$$T_{NAND(U200)} = -0.485 + 0.61 * T_{NAND(U203)} + 0.38 * T_{CLOCK} \quad \text{(EQ. 22)}$$

$$T_{BOTTOM} = 0.953 + 0.676 * T_{CLOCK} + 0.284 * T_{NAND(U203)} \quad \text{(EQ. 23)}$$

Note that, in this example, no alternative formula is required for $T_{TOP}$ since $T_{TOP}$ is not estimated using $T_{ASIC}$ in Equation 18.

Figure 8:
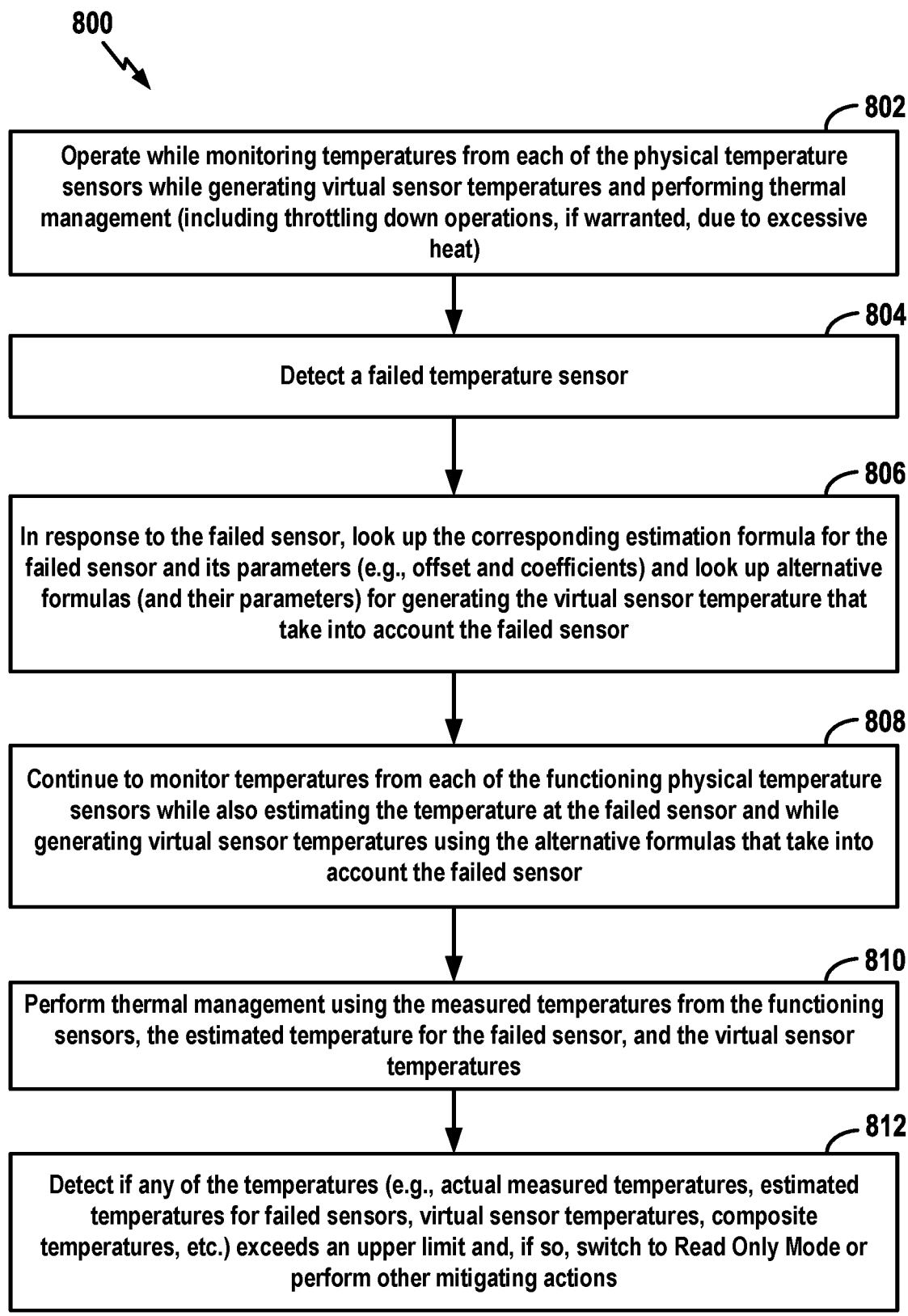
FIG. 8 illustrates an exemplary procedure for detecting and responding to a failed temperature sensor in an SSD where virtual sensor temperatures are used, in accordance with some aspects of the disclosure.

FIG. 8 an exemplary procedure 800 that may be performed by the SSD 104 of FIG. 1 (or other suitable device) for detecting and responding to a failed temperature sensor in an SSD where virtual sensor temperatures are used. At block 802, the SSD 104 operates while its thermal management controller 115 monitors temperatures from each of the physical temperature sensors while generating virtual sensor temperatures and performing thermal management (including throttling down operations, if warranted, due to excessive heat). As explained, the virtual sensor temperatures may be generated from the various physical temperature sensor readings. Thermal management may involve composite temperatures that are derived from the actual temperatures and/or the virtual sensor temperature sensors. At block 804, the failed temperature sensor manager 116 detects a failed temperature sensor. At block 806, in response to the failed sensor, the failed temperature sensor manager 116 looks up the corresponding estimation formula for the failed sensor and its parameters (e.g., its offset and coefficients) and looks up the alternative formulas (and their parameters) for generating virtual sensor temperatures that take into account the failed sensor.

At block 808, the failed temperature sensor manager 116 continues to monitor temperatures from each of the functioning physical temperature sensors while also estimating the temperature at the failed sensor and while generating virtual sensor temperatures using the alternative formulas that take into account the failed sensor. At block 810, the thermal management controller 115 performs thermal management using the measured temperatures from the functioning sensors, the estimated temperature for the failed sensor, and the virtual sensor temperatures. Again, this may involve generating composite temperatures as well. At block 812, the thermal management controller detects if any of the temperatures (e.g., actual measured temperatures, estimated temperatures for failed sensors, virtual sensor temperatures, composite temperatures, etc.) exceeds an upper limit (which may differ for each component or location) and, if so, switches the SSD to Read Only mode or performs other mitigating actions.

Exemplary SSD Embodiments

Figure 9:
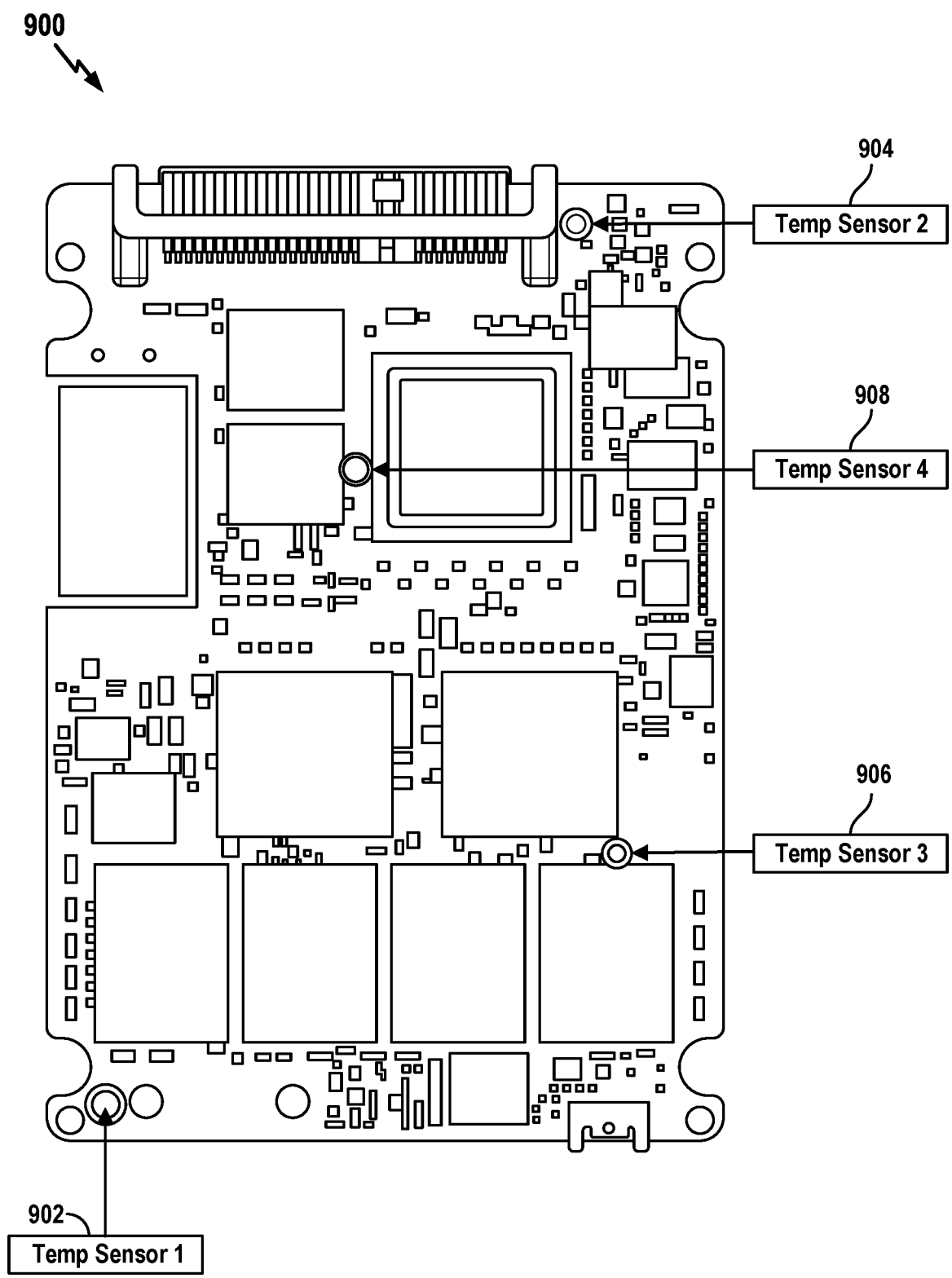
FIG. 9 is a schematic diagram illustrating an exemplary SSD implemented on a printed circuit board (PCB) having temperature sensors placed at various locations in accordance with some aspects of the disclosure.

FIG. 9 is a schematic diagram illustrating an exemplary SSD implemented on PCB 900 having four temperature sensors placed at various locations in accordance with some aspects of the disclosure. In an aspect, a temperature sensor is capable of monitoring the temperature of various device components, such as a NAND, a DRAM, a Front End ASIC (FE), or a Flash Manager ASIC (FM), for example. In the exemplary implementation, a temperature sensor 902 (Temp Sensor 1) may be a first ambient temperature sensor located at a drive inlet and configured to monitor a drive inlet air temperature. A temperature sensor 904 (Temp Sensor 2) may be a second ambient temperature sensor located at a drive outlet and configured to monitor a drive outlet air temperature. A temperature sensor 906 (Temp Sensor 3) may be located between an FM and a hottest NAND and configured to monitor a hottest NAND temperature. A temperature sensor 908 (Temp Sensor 4) may be located between an FE and a hottest DDR RAM and configured to monitor a hottest DDR RAM temperature. The various failed sensor temperature estimation procedures described above may be performed to estimate temperatures at the various sensor locations should one of the sensors fail. The various virtual sensor temperature estimation procedures described above may be performed to generate virtual sensor temperatures at various other locations on or in the SSD.

Figure 10:
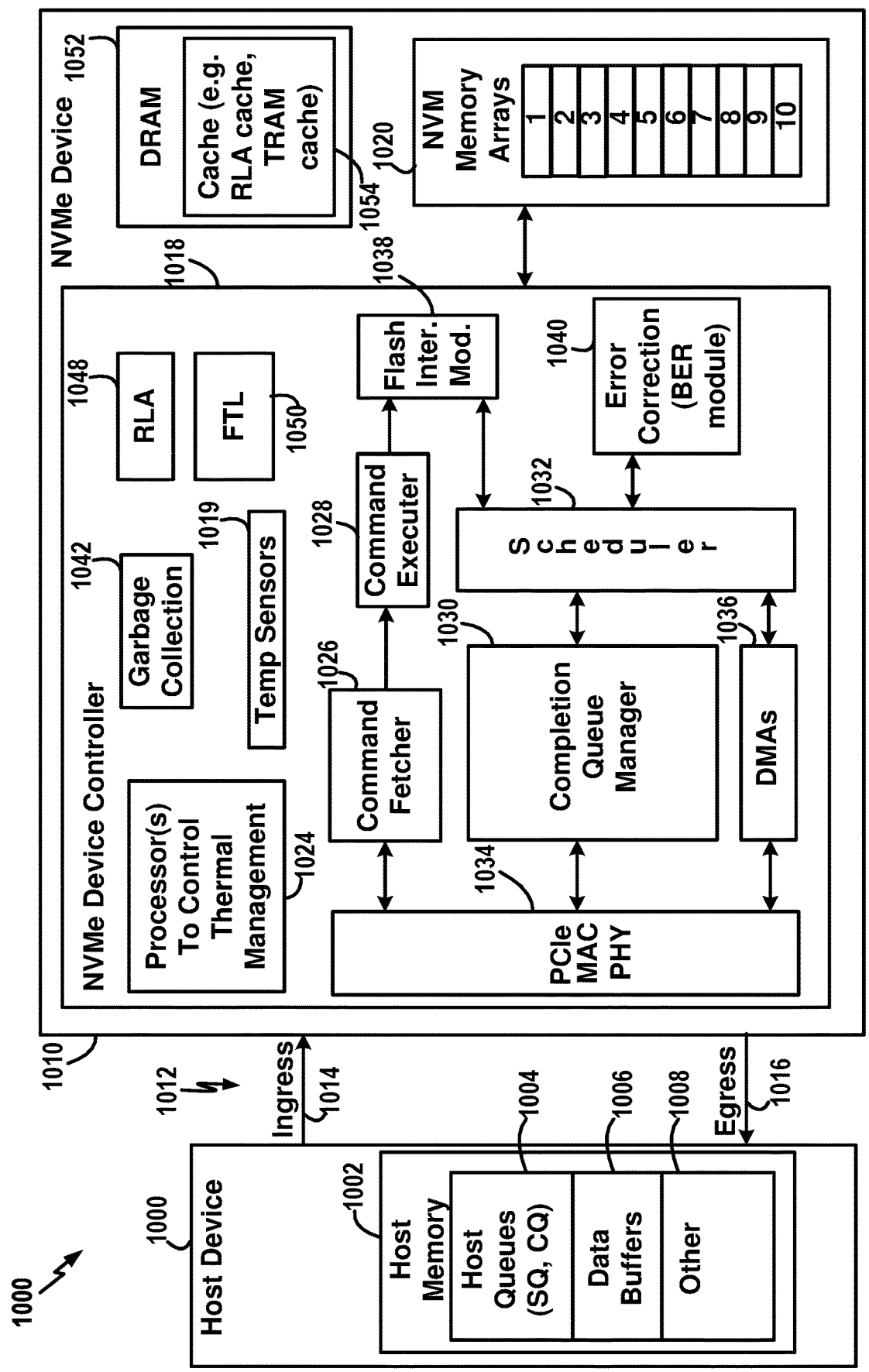
FIG. 10 is a schematic block diagram illustrating an exemplary data storage system with a NVM express (NVMe) device controller, in accordance with some aspects of the disclosure.

FIG. 10 is a schematic block diagram illustrating an exemplary data storage system with a Non-Volatile Memory express (NVMe) device controller 1018, the controller configured to perform the thermal management procedures described above (including the failed sensor temperature estimation procedures and the virtual sensor temperature generation procedures) in accordance with some aspects of the disclosure. The system includes a host device 1000 that may be any suitable computing or processing platform capable of accessing memory on an NVM data storage device to write data using NVMe procedures. The host device 1000 includes internal host memory 1002, which in this example is dynamic random-access memory (DRAM). The host memory 1002 may be configured to include, as shown, various host submission queues (SQs) and completion queues (CQs) 1004, data buffers 1006 and other memory components 1008. The host device 1000 may store data in an NVMe storage device 1010. The NVMe device 1010 may be any suitable device that provides non-volatile memory storage for host device 1000 in accordance with NVMe standards. For example, the NVMe device 1010 may be a removable storage device, such as a flash SSD that is removably connectable to host device 1000. In another example, the NVMe device 1010 may be non-removable or integrated within the host device 1000. In some embodiments, the host device 1000 and the NVMe device 1010 are communicatively connected via a PCIe bus 1012 (including ingress 1014 and egress 1016).

The NVMe storage device 1010 of FIG. 10 includes an NVMe controller 1018 and a non-volatile memory 1020. The NVMe controller 1018 controls access to the non-volatile memory 1020 such as a NAND. The NVMe controller 1018 thus may be a non-volatile memory controller that implements or supports the NVMe protocol, and the non-volatile memory 1020 may be implemented with two dimensional (2D) or three dimensional (3D) NAND flash memory. The NVMe controller includes one or more processors 1024 configured to control/manage thermal throttling, including thermal shutdown and recovery, and switching into Read Only mode, if warranted. The processor(s) 1024 are also responsible for the execution of other front-end and back-end tasks.

In operation, a command fetcher 1026 of the NVMe controller 1018 fetches commands, such as read requests for data, from the submission queues within the host memory 1002 and forwards the commands to a command executer 1028. The command fetcher 1026 is responsible for fetching and parsing the commands from the host and queuing them internally, and may form part of a front end of the NVMe controller 1018. The command executer 1028 is responsible for arbitrating and executing the commands. Upon completion of the commands, the NVMe controller 1018 generates completion entries that are ultimately directed to the completion queues within the host memory 1002. A completion queue manager 1030 is responsible for managing the host completion queues. Among other functions, the completion queue manager 1030 routes completion entries received from a scheduler 1032 to a completion queue within the host device 1000 via a PCIe MAC PHY interface 1034.

Actual streams of data (obtained as the result of read commands applied to the NVM memory arrays 1020) are delivered to the host device 1000 using one or more DMAs 1036. Additional components of the NVMe controller 1018 shown in FIG. 10 include a flash interface module (FIM) 1038, which is responsible for controlling and accessing the memory arrays 1020, and an error correction code (ECC) component 1040, which includes a bit error rate (BER) module.

Additional components of the NVMe controller 1018 include: a garbage collection module 1042 for controlling garbage collection and related tasks; a read look ahead (RLA) controller 1048; and a flash translation layer (FTL) 1050. Note that some of these components may be part of the flash interface module 1038 but are shown separately for the sake of completeness and convenience. The NVMe storage device 1010 may additionally include a DRAM 1052 (or other working memory), which may include a cache 1054.

In one aspect, the thermal management processor 1024 can perform one or more of the actions of controller 115 of FIG. 1 and/or manager 116 of FIG. 1. For example, in one aspect, the thermal management processor 1024 can detect a failure of one of the temperature sensors; identify, based on the temperature sensor that failed, a formula for estimating the temperature at the failed sensor from temperature data from one or more of the other temperature sensors; obtain temperature data from the one or more of the other temperature sensors; estimate, based on the obtained temperature data and the formula, the temperature at the failed sensor; and control at least one function of the data storage device based on the estimated temperature at the failed sensor. In one aspect, the thermal management processor 1024 can be implemented as a single processor. In another aspect, the thermal management processor 1024 can be implemented with a main processor and a secondary processor (e.g., a physical storage or PS processor). The main processor can be directed to performing the general functions of the controller 1018, while the PS processor can be directed to performing the functions (e.g., reads and writes) related to communication with the memory arrays 1020.

In one aspect, NAND memory arrays 1020 can include one or more temperature sensors disposed to measure temperatures at the NAND arrays 1020, or at particular NAND arrays. In one aspect, the temperature sensors can be disposed within the controller 1018 (e.g., temperature sensors 1019). In one aspect, one or more temperature sensors can be disposed at the NVM 1020 and one or more can be disposed at, or within, the controller 1018.

Figure 11:
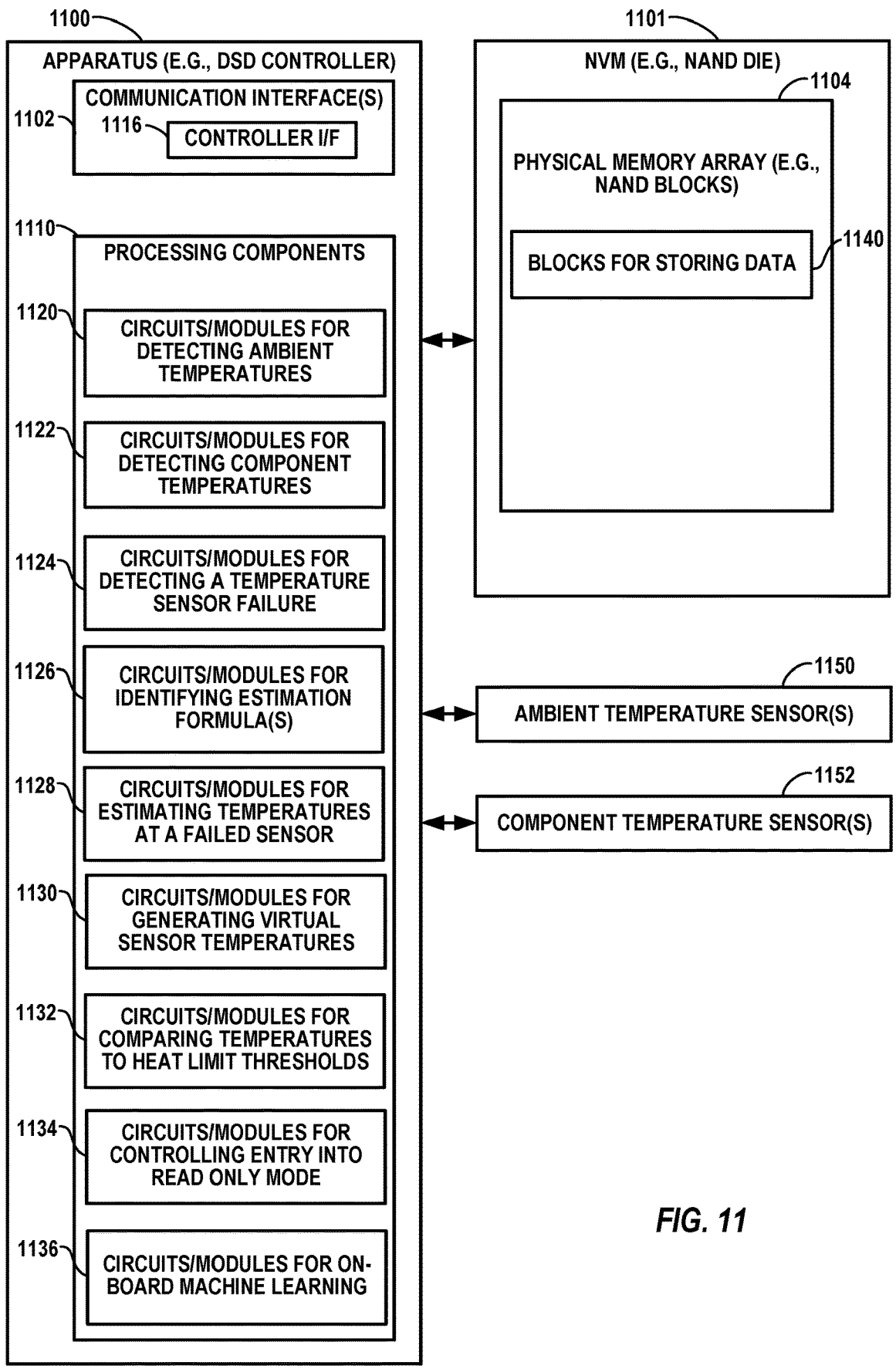
FIG. 11 is a schematic block diagram illustrating an exemplary data storage device configured in accordance with some aspects of the disclosure.

FIG. 11 illustrates an embodiment of an exemplary data storage device 1100 configured according to one or more aspects of the disclosure. The apparatus 1100, or components thereof, could embody or be implemented within a data storage controller such as a DSD controller coupled to a volatile memory (not shown), one or more ambient temperature sensors 1150, one or more component temperature sensors 1152, and a NAND die or some other type of NVM array that supports data storage. In various implementations, the apparatus 1100, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 1100 includes a communication interface 1102 and is coupled to a NVM 1101 (e.g., a NAND die). The NVM 1101 includes physical memory array 1104. The communication interface 1102 is further coupled to the one or more ambient temperature sensors 1150 and the one or more component temperature sensors 1152. These components can be coupled to and/or placed in electrical communication with one another via suitable components, represented generally by the connection line in FIG. 11. Although not shown, other circuits such as timing sources, peripherals, voltage regulators, and power management circuits may be provided, which will not be described any further.

The communication interface 1102 of the apparatus 1100 provides a means for communicating with other apparatuses over a transmission medium. In some implementations, the communication interface 1102 includes circuitry and/or programming (e.g., a program) adapted to facilitate the communication of information bi-directionally with respect to one or more devices in a system. In some implementations, the communication interface 1102 may be configured for wire-based communication. For example, the communication interface 1102 could be a bus interface, a send/receive interface, or some other type of signal interface including circuitry for outputting and/or obtaining signals (e.g., outputting signal from and/or receiving signals into a DSD).

The physical memory array 1104 may include one or more NAND blocks 1140. The physical memory array 1104 may be accessed by the processing components 1110. In one aspect, the apparatus 1100 may also include volatile memory for storing instructions and other information to support the operation of the processing components 1110.

The apparatus 1100 includes various processing components 1110 arranged or configured to obtain, process and/or send data, control data access and storage, issue or respond to commands, and control other desired operations. For example, the processing components 1110 may be implemented as one or more processors, one or more controllers, and/or other structures configured to perform functions. According to one or more aspects of the disclosure, the processing components 1110 may be adapted to perform any or all of the features, processes, functions, operations and/or routines described herein that pertain to SSDs. For example, the processing components 1110 may be configured to perform any of the steps, functions, and/or processes described with respect to FIGS. 4, 5, 7, 8, and 13. As used herein, the term "adapted" in relation to processing components 1110 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 4, 5, 7, 8, and 13. The processing components 1110 serve as an example of a means for processing. In various implementations, the processing components 1110 may provide and/or incorporate, at least in part, functionality described above for the components of controller 108 of FIG. 1 or controller 1018 of FIG. 10.

According to at least one example of the apparatus 1100, the processing components 1110 may include one or more of: circuit/modules 1120 configured for detecting an ambient temperature of the data storage device (e.g., via the one or more ambient temperature sensors 1150); circuit/modules 1122 configured for detecting one or more component temperatures of one or more components of the data storage device (e.g., via the one or more component temperature sensors 1152); circuits/modules 1124 configured for detecting a temperature sensor failure (i.e. a failure of one or the temperature sensors 1150, 1152); circuits/modules 1126 configured for identifying estimation formula(s), such as one of the formulas of Equations 2-8, above; circuits/modules 1128 configured for estimating temperatures at a failed sensor, such as by using an identified formula; circuits/modules 1130 configured for generating virtual sensor temperatures, as such by using one the formulas of Equations 10-14, above; circuits/modules 1132 configured for comparing temperatures to heat limit thresholds, such as thermal management thresholds; circuits/modules 1134 configured for controlling entry into read only mode (in response, for example, to an estimated temperature exceeding its heat limit threshold) or for controlling other device functions in response to estimated or virtual sensor temperatures; and circuits/modules 1136 configured for on-board machine learning to set up or update offsets and/or coefficients.

In at least some examples, means may be provided for performing the functions illustrated in FIG. 11 and/or other functions illustrated or described herein. For example, the means may include one or more of: means, such as circuits/modules 1120, for detecting an ambient temperature of the data storage device 1100; means, such as circuits/modules 1122, for detecting one or more component temperatures of one or more components of the data storage device 1100; means, such as circuits/modules 1124, for detecting a temperature sensor failure (i.e. a failure of one or the temperature sensors 1150, 1152); means, such as circuits/modules 1126, for identifying estimation formula(s); means, such as circuits/modules 1128, for estimating temperatures at a failed sensor, such as by using an identified formula; means, such as circuits/modules 1130, for generating virtual sensor temperatures; means, such as circuits/modules 1132, for comparing temperatures to heat limit thresholds; means, such as circuits/modules 1134, for controlling entry into read only mode or for controlling other device functions in response to estimated or virtual sensor temperatures; and means, such as circuits/modules 1136, for performing on-board machine learning to set up or update offsets and/or coefficients. Note that the circuits/modules 1120 and 1122 may further provide means for obtaining temperature data from one or more of the other temperature sensors (e.g., when one of the sensors has failed).

Additional Exemplary Apparatus

Figure 12:
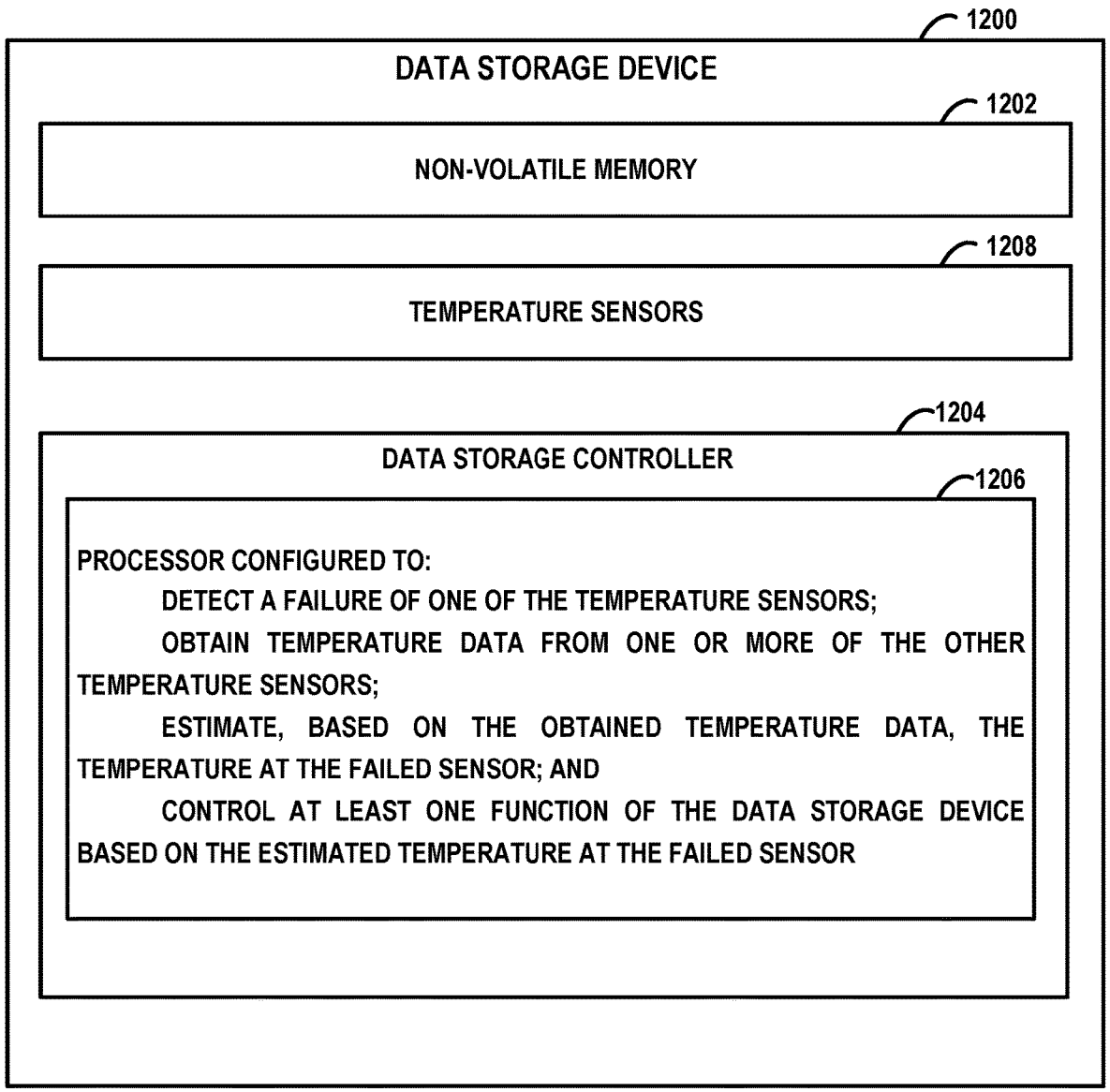
FIG. 12 is another schematic block diagram configuration for an exemplary data storage device configured in accordance with some aspects of the disclosure.

FIG. 12 broadly illustrates a data storage device 1200 configured according to one or more aspects of the disclosure. The data storage device 1200 includes an NVM 1202, a set of or plurality of temperature sensors 1208, and a data storage controller 1204. The data storage controller 1204 includes a processor or processing circuit 1206 configured to: detect a failure of one of the temperature sensors 1208; obtain temperature data from one or more of the other temperature sensors among sensors 1208; estimate, based on the obtained temperature data, the temperature at the failed sensor; and control at least one function of the data storage device based on the estimated temperature at the failed sensor.

In one aspect, the processor 1106 may be further configured to determine whether the estimated temperature exceeds a threshold and, responsive to the estimated temperature exceeding the threshold, control the data storage device to enter a Read Only mode.

In one aspect, the processor 1106 may be further configured to detect the failure of the temperature sensor by detecting the sensor providing a plurality of consecutive temperature values that are outside of an expected temperature range, such as 128 consecutive temperature values that are outside of the expected temperature range.

In one aspect, the processor 1106 may be further configured to estimate the temperature at the failed temperature sensor based on temperature data obtained from a nearest of the one or more other sensors.

In one aspect, the processor 1106 may be further configured to estimate the temperature at the failed temperature sensor based on an average of temperature data obtained from the one or more other sensors.

In one aspect, to estimate the temperature at the failed sensor based on the obtained temperature data, the processor 1106 may be further configured to identify, based on the temperature sensor that failed, a formula for estimating the temperature at the failed sensor from temperature data from the one or more of the other temperature sensors.

In one aspect, wherein the formula is one of a plurality of formulas, the processor 1106 may be further configured to store parameters in the NVM 1202 representative of the plurality of formulas, wherein each formula is for use in estimating the temperature at a particular temperature sensor using temperatures from one or more of the other sensors. See, for examples, the formulas of Equations 2-8, above.

In one aspect, the processor 1106 may be further configured to store an offset and one or more coefficients in the NVM 1202 for each of the formulas as the parameters that are representative of the plurality of formulas.

In one aspect, the temperature sensors 1208 include a first sensor configured to measure the temperature of the NVM 1202; a second sensor configured to measure the temperature of the processor 1206; a third sensor configured to measure the temperature of a clock generator of the data storage device (such as clock generator 214 of FIG. 2); and a fourth sensor configured to measure the temperature of a volatile memory of the data storage device (such as DDR 204 of FIG. 2).

Figure 13:
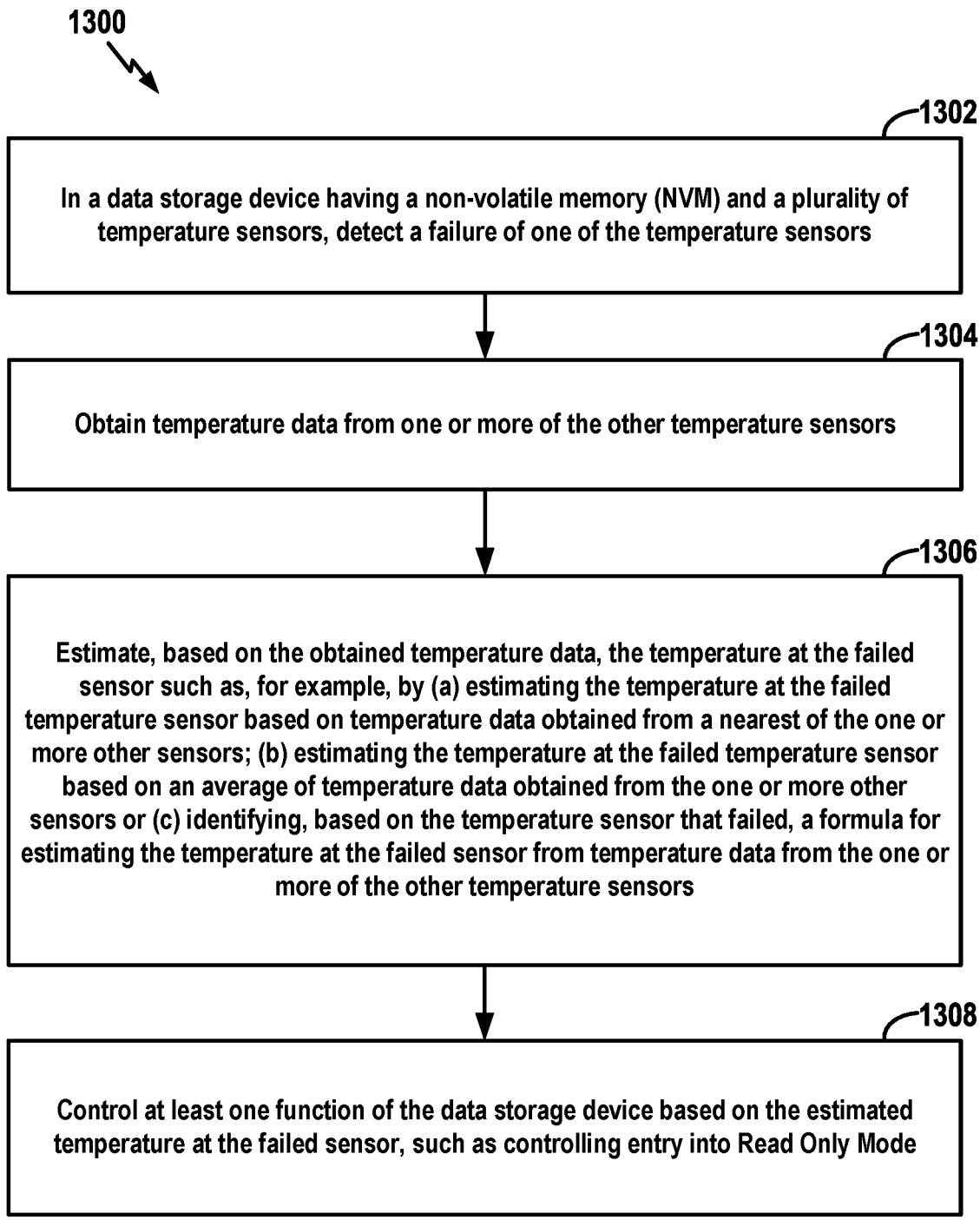
FIG. 13 is a flowchart illustrating a method or procedure for use by a DSD or an SSD in accordance with some aspects of the disclosure.

FIG. 13 broadly illustrates a method 1300 according to one or more aspects of the disclosure for use a data storage device having an NVM and a set of or plurality of temperature sensors. At block 1302, the data storage device detects a failure of one of the temperature sensors. At block 1304, the data storage device obtains temperature data from one or more of the other temperature sensors. At block 1306, the data storage device estimates, based on the obtained temperature data, the temperature at the failed sensor. The estimation may be performed, for example, by (a) estimating the temperature at the failed temperature sensor based on temperature data obtained from a nearest of the one or more other sensors; (b) estimating the temperature at the failed temperature sensor based on an average of temperature data obtained from the one or more other sensors or (c) identifying, based on the temperature sensor that failed, a formula for estimating the temperature at the failed sensor from temperature data from the one or more of the other temperature sensors. At block 1308, the data storage device controls at least one of its functions based on the estimated temperature at the failed sensor, such as controlling entry into Read Only Mode.

In one aspect, the method also includes storing parameters in the NVM representative of the plurality of formulas, wherein each formula is for use in estimating the temperature at a particular temperature sensor using temperatures from one or more of the other sensors. See, for example, the equations listed above and the blocks of FIG. 4.

In one aspect, the method also includes storing an offset and one or more coefficients for each of the formulas as the parameters that are representative of the plurality of formulas. See, for example, the equations listed above and the blocks of FIG. 4.

In one aspect, the offset and the one or more coefficients are determined during a calibration procedure using machine learning. See, for example, the equations listed above and the blocks of FIG. 3.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
    a non-volatile memory (NVM);
    a plurality of temperature sensors; and
    one or more processors coupled to the NVM and the plurality of temperature sensors, the one or more processors, individually or in combination, configured to:
        detect a failure of one of the temperature sensors;
        obtain temperature data from one or more of the other temperature sensors;
        estimate, based on the obtained temperature data, the temperature at the failed temperature sensor;
        estimate, based on the obtained temperature data and the estimated temperature at the failed temperature sensor, the temperature at a virtual temperature sensor location that is different from a location of the failed temperature sensor; and
        control at least one function of the data storage device based on the estimated temperature at the virtual temperature sensor location.

2. The data storage device of claim 1, wherein the one or more processors are further configured, individually or in combination, to:
    determine whether the estimated temperature at the virtual temperature sensor location exceeds a threshold; and
    responsive to the estimated temperature at the virtual temperature sensor location exceeding the threshold, control the data storage device to enter a Read Only mode.

3. The data storage device of claim 1,
    wherein the plurality of temperature sensors includes an NVM temperature sensor configured to measure the temperature of the NVM, and
    wherein the one or more processors are further configured, individually or in combination, to estimate, in response to a failure of the NVM temperature sensor, the temperature of the NVM from the temperature data obtained from the other temperature sensors and the temperature at the virtual temperature sensor location.

4. The data storage device of claim 3, wherein the one or more processors are further configured, individually or in combination, to execute write commands to write data in the NVM despite the failure of the NVM temperature sensor so long as the estimated temperature of the NVM does not exceed a threshold that triggers a Read Only mode.

5. The data storage device of claim 1, wherein the one or more processors are further configured, individually or in combination, to:
    store a formula in a memory of the data storage device for estimating the temperature at the failed temperature sensor, the formula derived from historical temperature data from the one or more of the other temperature sensors; and
    estimate the temperature at the failed temperature sensor using the formula.

6. The data storage device of claim 5, wherein the one or more processors are further configured, individually or in combination, to:
    determine the formula for estimating the temperature at the failed temperature sensor based on the historical temperature data using a machine learning model.

7. The data storage device of claim 1, wherein the one or more processors are further configured, individually or in combination, to:
    store a formula in a memory of the data storage device for estimating the temperature at the virtual temperature sensor location; and
    estimate the temperature at the virtual temperature sensor location using the formula.

8. The data storage device of claim 1, wherein the one or more processors are further configured, individually or in combination, to:
    estimate the temperature at the failed temperature sensor based on temperature data obtained from a nearest of the one or more other temperature sensors to the failed temperature sensor.

9. The data storage device of claim 1, wherein the one or more processors are further configured, individually or in combination, to:
    estimate the temperature at the failed temperature sensor based on an average of the temperature data obtained from the one or more other temperature sensors.

10. The data storage device of claim 1, wherein the plurality of temperature sensors comprises:
    a first sensor configured to measure the temperature of the NVM;
    a second sensor configured to measure the temperature of the one or more processors; and
    a third sensor configured to measure the temperature of a clock generator of the data storage device.

11. The data storage device of claim 1, wherein the one or more processors are further configured, individually or in combination, to control the at least one function of the data storage device based on the estimated temperature at the virtual temperature sensor location and the estimated temperature at the failed temperature sensor, while using different triggering-thresholds for the estimated temperature at the virtual temperature sensor location and the estimated temperature at the failed temperature sensor.

12. A method for use by a data storage device having a non-volatile memory (NVM) and a plurality of temperature sensors, the method comprising:
  detecting a failure of one of the temperature sensors;
  obtaining temperature data from one or more of the other temperature sensors;
  estimating, based on the obtained temperature data, the temperature at the failed temperature sensor;
  estimating, based on the obtained temperature data and the estimated temperature at the failed temperature sensor, the temperature at a virtual temperature sensor location that is different from a location of the failed temperature sensor; and
  controlling at least one function of the data storage device based on the estimated temperature at the virtual temperature sensor location.

13. The method of claim 12, further comprising:
  determining whether the estimated temperature at the virtual temperature sensor location exceeds a threshold; and
  responsive to the estimated temperature at the virtual temperature sensor location exceeding the threshold, controlling the data storage device to enter a Read Only mode.

14. The method of claim 12, wherein the plurality of temperature sensors includes an NVM temperature sensor configured to measure the temperature of the NVM, and wherein the method further comprises estimating, in response to a failure of the NVM temperature sensor, the temperature of the NVM from the temperature data obtained from the other temperature sensors and the temperature at the virtual temperature sensor location.

15. The method of claim 14, further comprising executing write commands to write data in the NVM despite the failure of the NVM temperature sensor so long as the estimated temperature of the NVM does not exceed a threshold that triggers a Read Only mode.

16. The method of claim 12, further comprising:
  storing a formula within a memory of the data storage device for estimating the temperature at the failed temperature sensor, the formula derived from historical temperature data from the one or more of the other temperature sensors; and
  estimating the temperature at the failed temperature sensor using the formula.

17. The method of claim 16, further comprising:
  determining the formula for estimating the temperature at the failed temperature sensor based on the historical temperature data using a machine learning model.

18. The method of claim 12, further comprising:
  storing a formula within a memory of the data storage device for estimating the temperature at a virtual temperature sensor location; and
  estimating the temperature at the virtual temperature sensor location using the formula.

19. The method of claim 12, wherein controlling the at least one function comprises controlling the at least one function based on the estimated temperature at the virtual temperature sensor location and the estimated temperature at the failed temperature sensor, while using different triggering-thresholds for the estimated temperature at the virtual temperature sensor location and the estimated temperature at the failed temperature sensor.

20. An apparatus for use with a data storage device having a non-volatile memory (NVM) and a plurality of temperature sensors, the apparatus comprising:
  means for detecting a failure of one of the temperature sensors;
  means for obtaining temperature data from one or more of the other temperature sensors;
  means for estimating, based on the obtained temperature data, the temperature at the failed temperature sensor;
  means for estimating, based on the obtained temperature data and the estimated temperature at the failed temperature sensor, the temperature at a virtual temperature sensor location that is different from a location of the failed temperature sensor; and
  means for controlling at least one function of the data storage device based on the estimated temperature at the virtual temperature sensor location.

* * * * *